(12) United States Patent
Kamimae et al.

(10) Patent No.: US 8,152,225 B2
(45) Date of Patent: Apr. 10, 2012

(54) ROOF PANEL AND CAB WITH THE SAME, AND METHOD OF MANUFACTURING CAB

(75) Inventors: Takeshi Kamimae, Nomi (JP); Makoto Yomogita, Hirakata (JP)

(73) Assignee: Komatsu Ltd., Tokyo (JP)

( * ) Notice: Subject to any disclaimer, the term of this patent is extended or adjusted under 35 U.S.C. 154(b) by 236 days.

(21) Appl. No.: 12/526,293

(22) PCT Filed: Mar. 6, 2008

(86) PCT No.: PCT/JP2008/054037
§ 371 (c)(1),
(2), (4) Date: Aug. 7, 2009

(87) PCT Pub. No.: WO2008/129905
PCT Pub. Date: Oct. 30, 2008

(65) Prior Publication Data
US 2010/0320804 A1    Dec. 23, 2010

(30) Foreign Application Priority Data
Apr. 17, 2007 (JP) ................................. 2007-108654

(51) Int. Cl.
*B62D 25/06* (2006.01)
(52) U.S. Cl. .................... 296/190.08; 296/210
(58) Field of Classification Search ................ 296/102, 296/104, 135, 185.1, 216.06, 216.09, 187.13, 296/190.01, 190.08, 210, 213
See application file for complete search history.

(56) References Cited

U.S. PATENT DOCUMENTS

| | | | |
|---|---|---|---|
| 3,891,266 A * | 6/1975 | Wilfert et al. | 362/493 |
| 4,079,985 A | 3/1978 | Martin | |
| 5,273,340 A | 12/1993 | Nelson et al. | |
| 5,820,199 A * | 10/1998 | Camplin et al. | 296/102 |
| 2007/0024088 A1 | 2/2007 | Mori et al. | |

FOREIGN PATENT DOCUMENTS

| | | |
|---|---|---|
| CN | 2471675 Y | 1/2002 |
| EP | 1 666 343 A2 | 6/2006 |
| JP | 58-065515 A | 4/1983 |
| JP | 58-170273 U | 11/1983 |
| JP | 2002-249073 A | 9/2002 |

OTHER PUBLICATIONS

Office Action of corresponding Chinese Application No. 2008800123930 dated Nov. 4, 2010.
EP Search report of corresponding EP Application No. 08 72 1457.3 dated Sep. 15, 2010.

* cited by examiner

*Primary Examiner* — Dennis Pedder
*Assistant Examiner* — Jason S Daniels
(74) *Attorney, Agent, or Firm* — Global IP Counselors

(57) ABSTRACT

A roof panel of a cab installed on a work vehicle includes a planar portion and a plurality of bent portions. The planar portion serves as the roof surface of the work vehicle cab. The bent portions are formed on the outer periphery of the planar portion. The bent portions are bent at a predetermined angle with respect to the planar portion toward an external side of the roof surface of the work vehicle cab.

1 Claim, 20 Drawing Sheets

(a)

(b)

(c)

ROOF PANEL AND CAB WITH THE SAME, AND METHOD OF MANUFACTURING CAB

CROSS-REFERENCE TO RELATED APPLICATIONS

This national phase application claims priority to Japanese Patent Application No. 2007-108654, filed on Apr. 17, 2007. The entire disclosure of Japanese Patent Application No. 2007-108654 is hereby incorporated herein by reference.

TECHNICAL FIELD

The present invention relates to a roof panel that composes a roof surface of work vehicles such as bulldozer, hydraulic excavator, wheel loader and dumper truck, and a cab including the roof panel and a method of manufacturing the cab.

BACKGROUND ART

Conventional work vehicles such as wheel loader, bulldozer and hydraulic excavator include a cab (operator compartment) as an operator's room that is composed of square steel pipes or deformed steel pipes, panels and the like that are coupled to each other.

For example, Japanese Patent Laid-Open Publication No. 2002-249073 (published on Sep. 3, 2002) discloses a roof structure of a work vehicle cab that, in order to prevent that an outer roof composing a roof surface of a cab hangs down or is dented, includes a band plate of spring steel on an interior side of the outer roof.

SUMMARY OF THE INVENTION

However, the aforementioned known work vehicle cab roof structure has the following problems.

In the structure disclosed in Japanese Patent Laid-Open Publication No. 2002-249073, the band plate of spring steel is arranged along the interior side surface of the outer roof that holds and supports the outer roof so that, after a roof panel made of resin is mounted on the cab, it is prevented that the roof panel is dented due to its self weight, external loads or the like. For this reason, it is necessary to add a support member on the cab compartment space side of the roof surface. As a result, the number of components is increased that compose the cab.

Even in the case where the roof panel is made of a steel plate, the roof panel may be distorted due to thermal contraction after a welding process in cab assembling procedure. Thus, the roof surface may be dented.

It is an object of the present invention to provide a roof panel capable of preventing that the roof panel is dented after assembling procedure without increasing its component count, and a cab including the roof panel and a method of manufacturing the cab.

A roof panel according to a first aspect of the present invention is a roof panel of a work vehicle cab. The roof panel includes a planar portion and a plurality of bent portions. The planar portion serves as the roof surface of the work vehicle cab. The bent portions are formed on the outer periphery of the planar portion. The bent portions are bent at a predetermined angle(s) with respect to the planar portion toward an external side of the roof surface of the work vehicle cab.

In this roof panel, the bent portions are formed on the outer periphery of the planar portion of the roof panel that composes a roof surface of a work vehicle cab, and are bent at a predetermined angle(s) with respect to the planar portion that serves as the roof surface.

The aforementioned bent portion refers to a portion that is formed on the periphery of the panel and is bent at a predetermined angle(s) (e.g., 2 to 8 degrees) externally of the roof surface. Such a portion can be formed by a bender, a press or the like. For example, the aforementioned bent portions can be formed along edges of the roof panel that are opposed to each other. Also, the planar portion can have a generally quadrangular shape, and the aforementioned bent portions can be formed along the four edges of the planar portion.

Accordingly, in assembling procedure of a work vehicle cab, the bent portions formed on the periphery of the roof panel can be held by clamps or the like to beam members for supporting the roof surface so that the roof surface of the cab bulges externally in welding. For this reason, even if a stress is generated in the planar portion by thermal contraction after welding and the like, it can prevent that the roof surface is dented. As a result, the simply-configured roof panel can prevent that the roof surface is dented without constraint members that are required for the lower surface of a roof surface of the known roof panel to prevent that the roof surface is dented.

In a roof panel according to a second aspect of the present invention, in the roof panel according to the first aspect of the present invention, the bent portions extend along edges of the planar portion adjacent to each other. In addition, the roof panel further includes a cut-out portion between the bent portions.

In this configuration, the bent portions are formed on the outer peripheral sides of the planar portion of the roof panel, and extend along adjacent edges of the planar portion that interpose a cut-out portion.

Accordingly, in the case where the bent portions extend along the edges of the planar portion adjacent to each other, it is possible to prevent that, if parts of the bent portions remain that will intersect each other, interference between the parts may cause deterioration of precise formation of the bent portions or deformation of the bent portions. For this reason, the bent portions can be precisely formed. As a result, the height of a bulge part of the planar portion can be precisely controlled in the assembling procedure of the cab. Therefore, it is possible to form a roof panel with a desired shape.

In a roof panel according to a third aspect of the present invention, in the roof panel according to the first or second aspect of the present invention, the bent portions are formed along edges of the planar portion that are opposed to each other.

In this configuration, the bent portions are formed along edges of the planar portion that interpose the planar portion, and are opposed to each other.

Accordingly, the bent portions formed on sides of the planar portion can be held by clamps or the like to beam members of a cab so that the planar portion bulges upward of the roof surface. Therefore, in the case where the roof panel is mounted onto a roof part of a cab by welding, it is possible to prevent that the roof panel is dented by thermal contraction after welding and the like.

In a roof panel according to a fourth aspect of the present invention, in the roof panel according to the first or second aspect of the present invention, the planar portion has a generally quadrangular shape, and the bent portions are formed along the four edges of the planar portion.

In this configuration, the bent portions are formed along all the edges of the quadrangular planar portion that interpose the planar portion, and are opposed to each other.

Accordingly, two pairs of bent portions are formed on two pairs of sides of the planar portion opposed to each other, and can be held by clamps or the like so that the planar portion bulges upward of the roof surface. Therefore, in the case where the roof panel is mounted onto a roof part of a cab by welding, it is possible to prevent that the roof panel is dented by thermal contraction after welding and the like.

In a roof panel according to a fifth aspect of the present invention, in the roof panel according to the first or second aspect of the present invention, the planar portion has one of a generally quadrangular shape and a generally hexagonal shape.

In this configuration, a plate-shaped member with a generally quadrangular or hexagonal shape is used as a roof panel that composes a roof surface of a work vehicle cab.

Accordingly, bent portions are formed along edges of the quadrangular or hexagonal shape that are opposed to each other, for example, and can be tentatively held to beam members that support a roof surface so that the planar portion bulges upward in welding. Then, the roof panel is welded. As a result, it is possible to prevent that the planar portion is dented inward of a cab by thermal contraction after the welding and the like.

In a work vehicle cab according to a sixth aspect of the present invention includes a roof surface formed by the roof panel according to the first or second aspect of the present invention, and a plurality of pillar members forming a framework portion of the cab.

In this configuration, a cab is provided in that the aforementioned roof panel is used as a roof surface.

Accordingly, in assembling procedure of the work vehicle cab, the bent portions formed on the periphery of the roof panel can be held by clamps or the like to the beam members so that the roof surface of the cab bulges externally in welding. For this reason, even if a stress is generated in the planar portion by thermal contraction after welding, it can prevent that the roof surface is dented. As a result, it is possible to provide a simply-configured cab that can prevent that the roof surface is dented without constraint members that are required for the lower surface of a roof surface of the known roof panel to prevent that the roof surface is dented.

In a work vehicle cab according to a seventh aspect of the present invention includes a roof surface formed by the roof panel according to the second aspect of the present invention, and a plurality of pillar members and a plurality of beam members forming a framework portion of the cab. In addition, the pillar members are coupled at side surfaces thereof to the roof panel in contact with the cut-out portion of the roof panel.

In this configuration, pillar members that compose a framework portion of a cab are coupled at side surfaces of the pillar members to the roof panel in contact with the cut-out portion that is formed in the roof panel.

Accordingly, even in the case where the pillar members are secured to a roof member and a floor member by welding, it is possible to weld the pillar members on the exterior side of a cab structure that is tentatively assembled. Therefore, it is possible to provide a cab that can be assembled with improved workability.

A method of manufacturing a work vehicle cab according to an eighth aspect of the present invention includes the following steps. The outer peripheral parts of a plate-shaped member are bent to form a roof panel that includes a planar portion and bent portions. The bent portions are bent at a predetermined angle(s) with respect to the planar portion. The roof panel is placed on a roof part of the cab, and then the bent portions are held and tentatively secured on the roof part of the cab so that the planar portion bulges from the roof surface toward an external side of the work vehicle cab. The roof panel is secured on the roof part of the cab by welding whereby forming the roof surface.

In this configuration, a cab is assembled in that the aforementioned roof panel is used as a roof surface.

Specifically, bent portions are first formed in predetermined locations along certain edges of a planar portion of a plate-shaped member to form a roof panel (first step). Subsequently, the roof panel is placed on a roof part of a cab, and the bent portions are held on the cab side by clamps or the like (second step). In this step, since the bent portions are held on the cab side with being thrust, the planar portion budges upward. After that, the bent portions are partially or entirely secured to on the cab side by welding so that the planar portion serves as the roof surface (third step).

In the third step, the bent portions may be firmly welded, after the bent portions are tentatively secured by tentative welding and the fasteners such as clamps are removed.

Therefore, since the bent portions are welded with the planar portion bulging upward in the second step, it is possible to prevent that the planar portion as a roof surface of a cab is dented by thermal contraction after the welding and the like. For this reason, it is not necessary to add reinforcing members and the like on the interior side of a roof surface of a cab. Consequently, this method allows such simple configuration to prevent that the roof surface of the cab is dented.

BRIEF DESCRIPTION OF DRAWINGS

FIGS. 15(a) through 15(c) are a plan view, a front view and a side view, respectively, showing the configuration of a roof panel to be attached to a roof surface of the cab shown in FIG. 14, while FIG. 15(d) is a side view of a modified roof panel.

FIGS. 16(a) through 16(c) are a plan view, a front view and a side view, respectively, showing the configuration of the roof panel that is attached to the roof surface of the cab shown in FIG. 14, while FIG. 16(d) is a side view of a modified roof panel.

FIGS. 17(a) and 17(b) are plan views showing manufacturing processes of the roof panel shown in FIG. 16(a) or the like, while FIGS. 17(c) and 17(d) are side views of the roof panels.

FIGS. 19(a) and 19(b) are plan views showing manufacturing processes of a roof panel according to still another embodiment of the present invention, while FIG. 19(c) is a side view of the roof panel.

DETAILED DESCRIPTION OF THE PREFERRED EMBODIMENTS

First Embodiment

With reference to FIGS. 1 through 13, the following description will describe a roof panel 21a according to an embodiment of the present invention, a cab 20 that includes a roof surface including the roof panel 21a, and a method of manufacturing the cab 20.

Overall Configuration of Cab 20

Figure 1:
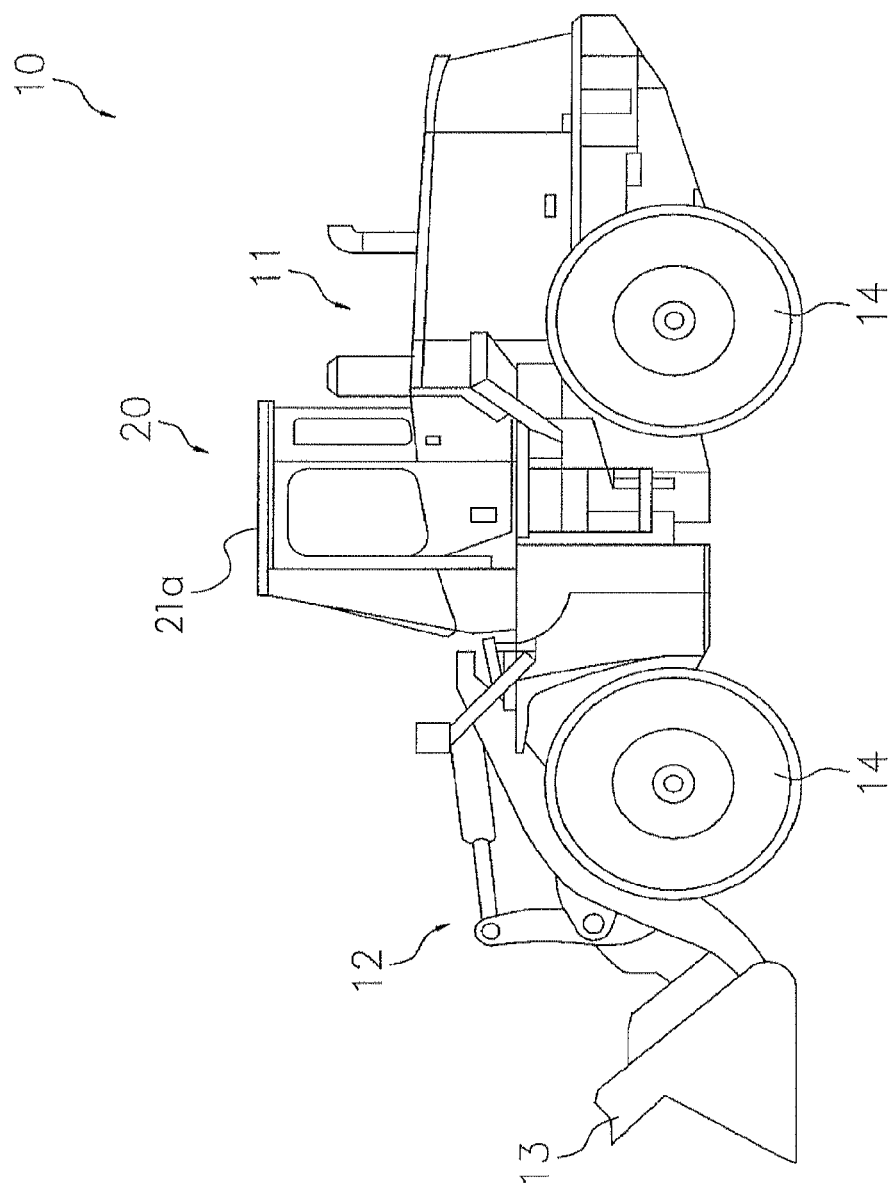
FIG. 1 is an external view showing a wheel loader, which includes a cab according to an embodiment of the present invention.

As shown in FIG. 1, the roof panel 21a according to this embodiment is applied to the cab 20, which is installed on a wheel loader (work vehicle) 10.

The wheel loader 10 includes a body 11, a lift arm 12, a bucket 13, four tires 14, and the cab 20. The lift arm 12 is mounted to a front part of the body. The bucket 13 is mounted to the fore end of the lift arm 12. The tires 14 bear the body 11, and revolve so that the body runs. The cab 20 is mounted on an upper part of the body 11.

The body 11 includes an engine compartment and actuator portions. The engine compartment accommodates an engine (not shown). The actuator portions actuate the lift arm 12 and the bucket 13.

The lift arms 12 are arm members that lift the bucket 13 mounted to the fore end of the lift arms 52, and are actuated by lift cylinders that are installed together.

The bucket 13 is mounted to the fore end of the arms 12. A bucket cylinder (not shown) is utilized for dumping and tilting of the bucket 53.

The cab 20 forms an operator compartment assembled from a plurality of steel pipes and a plurality of steel plates. The cab 20 is located in a part slightly frontward of the center of the body 11. The configuration and the assembling procedure of the cab 20 will be described bellow.

Configuration of Cab 20

Figure 2:
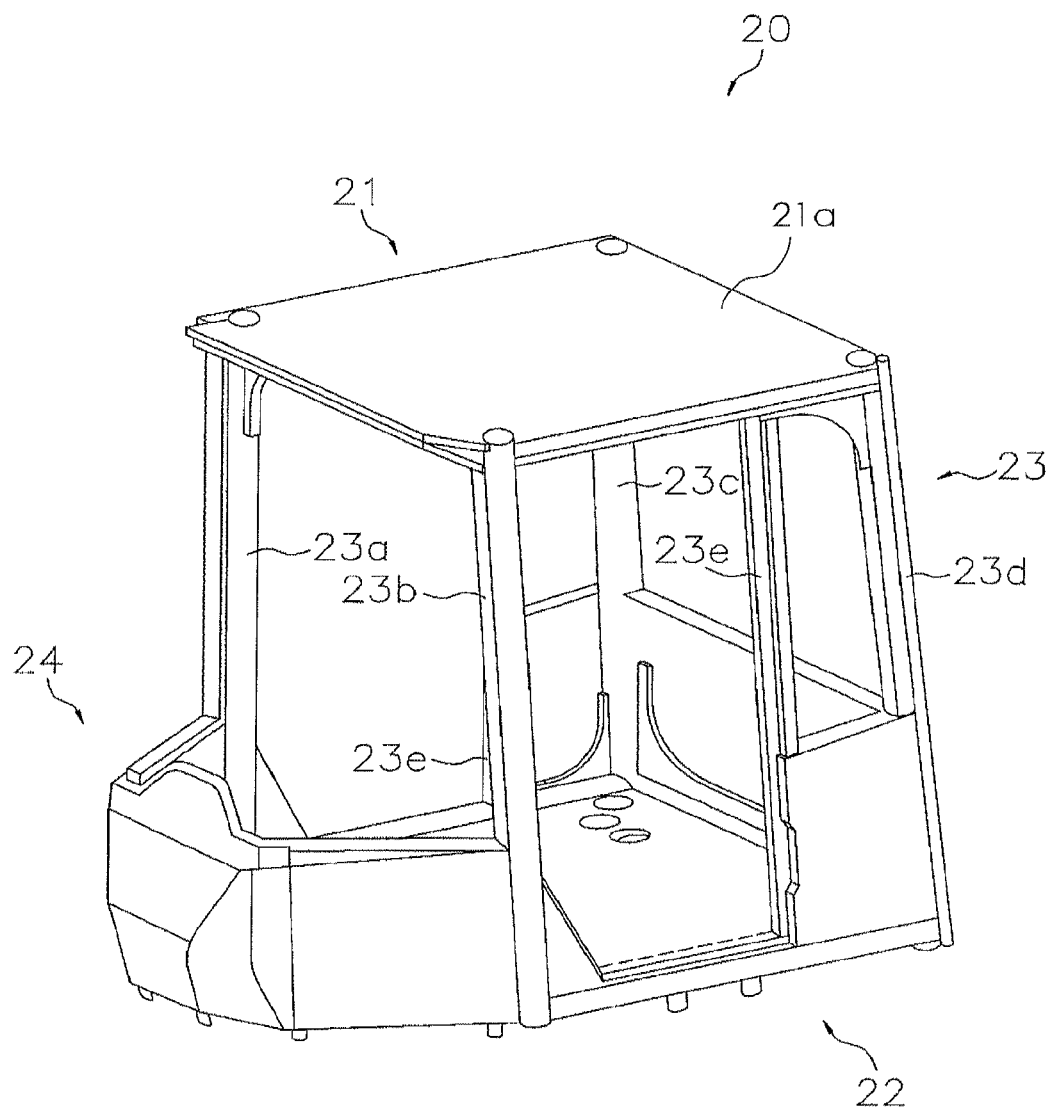
FIG. 2 is a perspective view showing the configuration of the cab, which is installed on the wheel loader shown in FIG. 1.

As shown in FIG. 2, the cab 20 includes the roof member 21, a floor member 22, pillar members 23, and a front cover member 24.

Configuration of Roof Member 21

Figure 3:
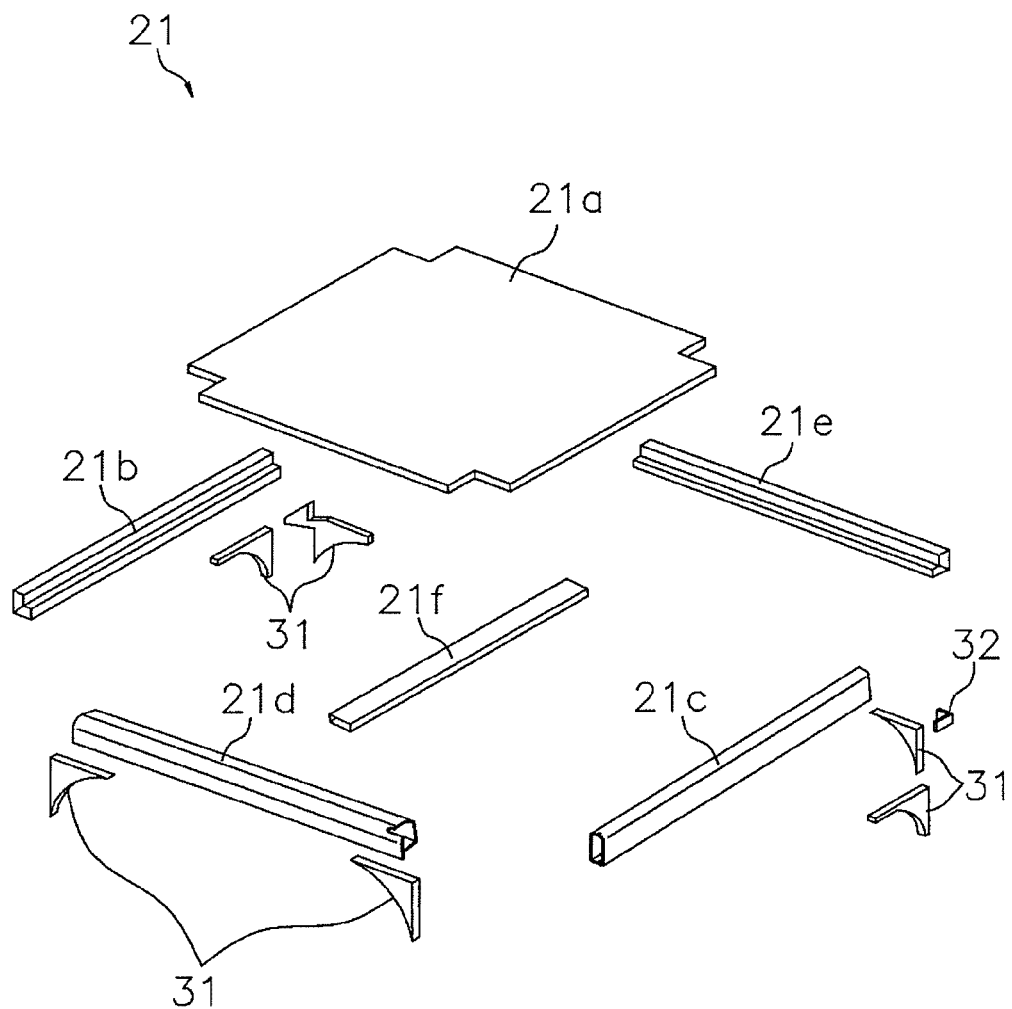
FIG. 3 is an exploded view showing components that are included as a roof member that composes the cab shown in FIG. 2.

The roof member 21 forms a top part of the cab 20, i.e., the roof of the operator compartment. As shown in FIG. 3, the roof member 21 includes a roof panel 21a, the four beam members 21b to 21e, a reinforcing beam member 21f, reinforcing members 31, and joint members 32.

The roof panel 21a is a plate-shaped member with a generally square shape formed from a steel plate. The four beam members 21b to 21e are secured along the four edges of the generally square shape. The configuration of the roof panel 21a 21 will be described in detail later.

Figure 4:
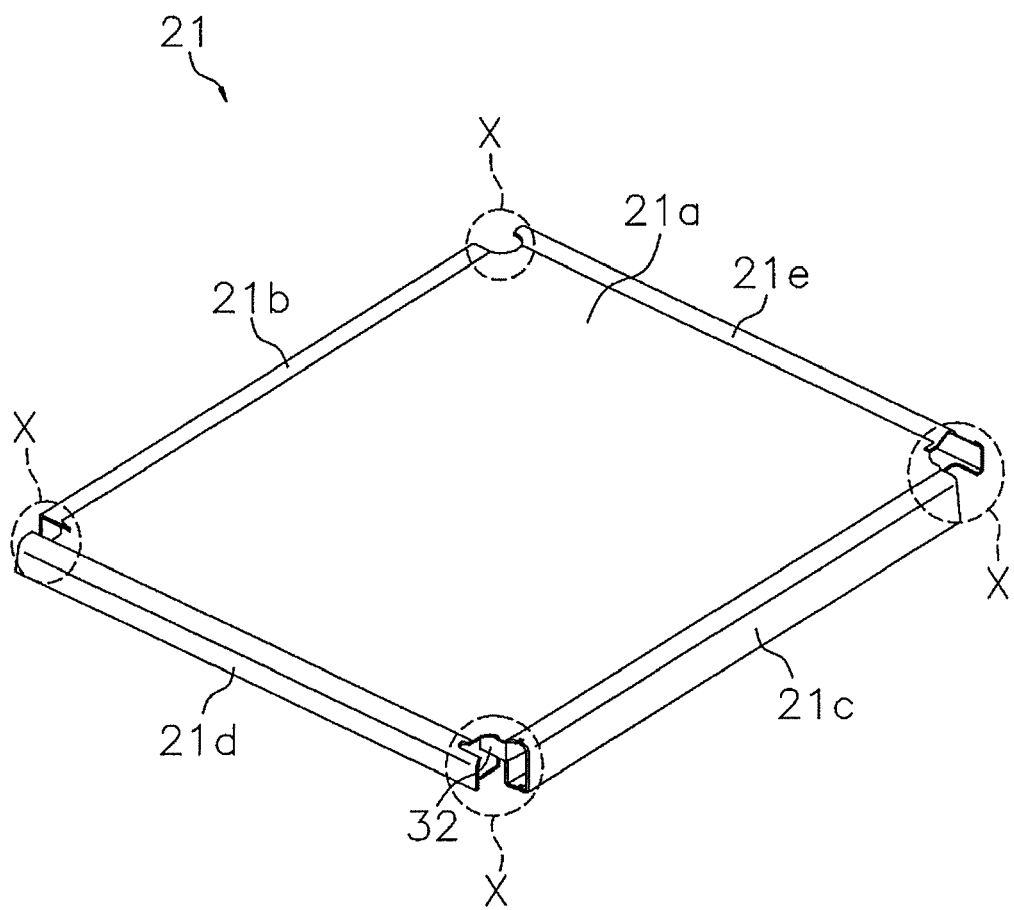
FIG. 4 is a perspective view showing the roof member composed of the assembled components shown in FIG. 3.

The beam members 21b to 21e are a bar-shaped member formed from a steel pipe. As discussed above, the four beam members 21b to 21e are secured along the four edges of the generally square roof member (roof panel 21a) so that the beam members 21b and 21c extend along edges opposed to each other, and the beam members 21d and 21e extend along the other edges opposed to each other. All of the four beam members 21b to 21e have deformed sections. The aforementioned roof panel 21a engages with and secured onto recessed parts formed on the beam members 21b to 21e having the deformed sections with the beam members 21b to 21e being arranged to form a generally square shape. As shown in FIG. 4, joint space parts X are formed at the four corners of the square shape formed by the four beam members 21b to 21e (parts where the beam members 21b to 21e would intersect each other if have extended). The joint space parts X have shapes corresponding to sectional shapes of the pillar members 23. In other words, the ends of each of the beam members 21b to 21e are shaped to engage with the sectional shape of each pillar member 23 to be attached to the joint space part X.

Note that FIGS. 4 and 3 show the configuration of the roof panel 21 that is removed from the cab 20, and the configuration of the roof panel 21 that is then exploded after the roof panel 21 is secured to the cab 20 as the roof surface. FIGS. 4 and 3 do not show the assembling procedure of the cab 20.

The reinforcing beam member 21f is a bar-shaped member formed of a steel pipe with a generally rectangular shape in section. The ends of the reinforcing beam member 21f are secured to substantially central parts of the beam members 21d and 21e. The thus-secured reinforcing beam member 21f improves the rigidity of the roof member 21.

The reinforcing members 31 are generally triangular plate-shaped members. The reinforcing members 31 are arranged on the recessed parts of the deformed sections of the beam members 21b to 21e in intersection parts with the pillar members 23. Since the reinforcing members 31 couple the beam members 21b to 21e and the pillar members 23 to each other, it is possible to improve the rigidity of the cab 20. Also, since the reinforcing members 31 are arranged on the recessed parts of the deformed sections of the beam members 21b to 21e, it is possible to easily position the reinforcing members 31.

The joint member 32 is formed by bending a plate member in its central part at a right angle. The joint members 32 are arranged in the intersection parts of the beam members 21b to 21e, in other words, in the jointing space parts X. Specifically, as shown in FIG. 4, the joint members 32 are secured onto the interior sides on ends of the steel pipes of the beam members 21b to 21e adjacent to each other to couple the adjacent beam members to each other.

Configuration of Floor Member 22

Figure 5:
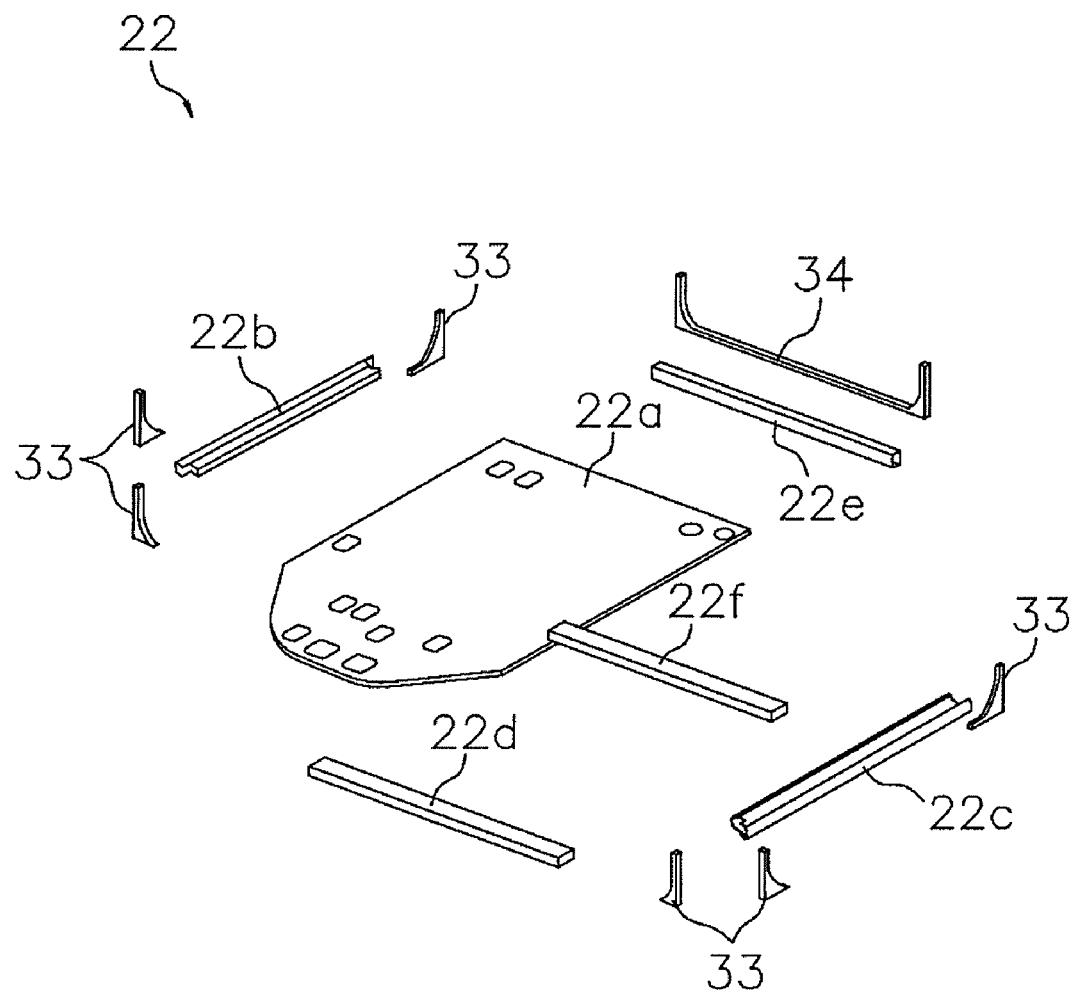
FIG. 5 is an exploded view showing components that are included as a floor member that composes the cab shown in FIG. 2.

The floor member 22 forms a bottom part of the cab 20, i.e., the floor of the operator compartment. As shown in FIG. 5, the roof member 22 includes a floor plate 22a, the four beam members 22b to 22e, a reinforcing beam member 22f, and reinforcing members 33 and 34.

The floor plate 22a is a plate-shaped member with a generally home plate shape formed of a steel plate. The four beam members 22b to 22e are arranged in a generally square shape, and are secured along edges of the plate.

Figure 6:
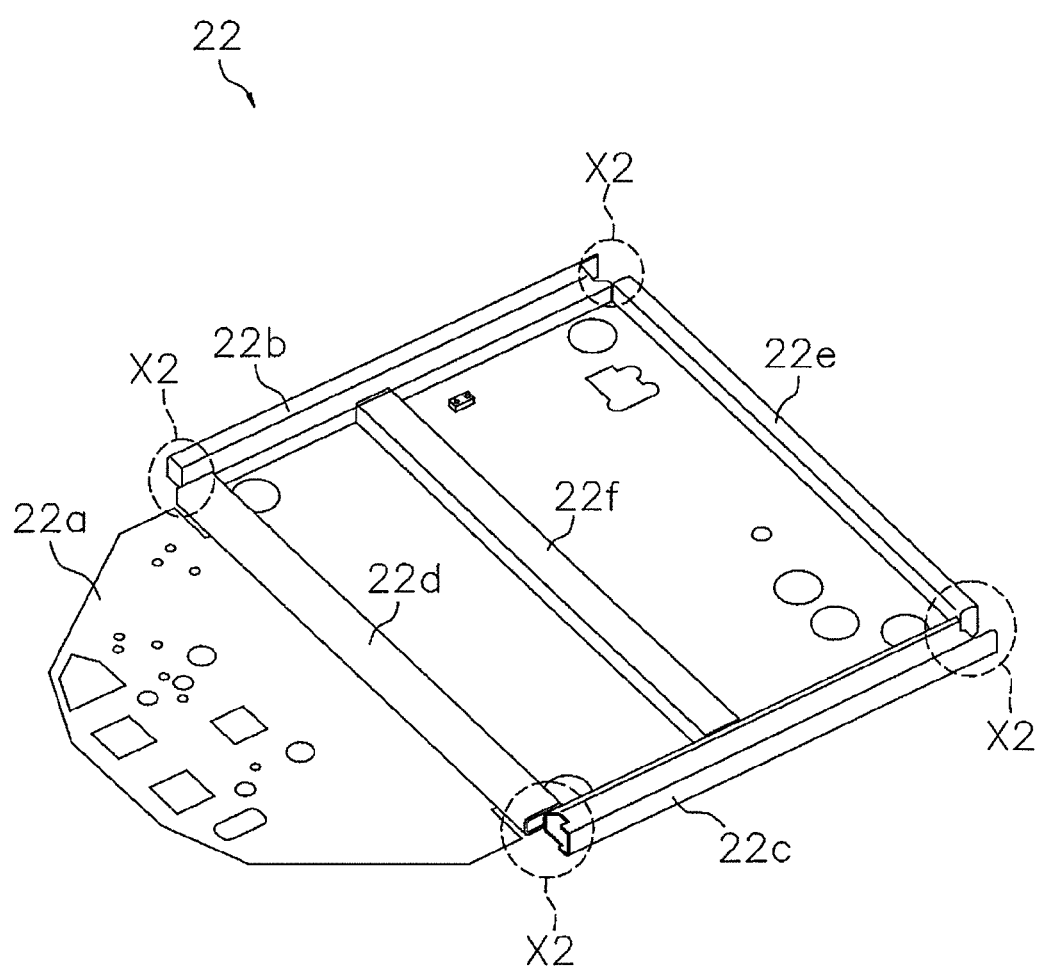
FIG. 6 is a perspective view showing the floor member composed of the assembled components shown in FIG. 5.

The beam members 22b to 22e are a bar-shaped member formed from a steel pipe. As discussed above, the four beam members 22b to 22e are secured along the outer periphery of the generally square floor plate 22a so that the beam members 22b and 22c extend along edges opposed to each other, and the beam members 22d and 22e extend along the other edges opposed to each other. Among the four beam members 22b to 22e, the beam members 22b, 22c and 22e have deformed sections. The aforementioned floor plate 22a engages with and secured onto recessed parts that are formed on the beam members 22b, 22c and 22e with the deformed sections with the beam members 22b, 22c and 22e being arranged to form a generally square shape. As shown in FIG. 6, joint space parts X2 are formed at the four corners of the square shape formed by the four beam members 22b to 22e (parts where the beam members 22b to 22e would intersect each other if have extended). The joint space parts X2 have shapes corresponding to sectional shapes of the pillar members 23. In other words, the ends of each of the beam members 22b to 22e are shaped to fit in with the sectional shape of each pillar member 23 to be attached to the joint space part X2.

The reinforcing beam member 22f is a bar-shaped member formed of a steel pipe with a generally rectangular shape in section. The ends of the reinforcing beam member 22f are secured to substantially central parts of the beam members 22b and 22c. The thus-secured reinforcing beam member 22f improves the rigidity of the floor member 22.

The reinforcing members 33 are a generally triangular plate-shaped member similar to the reinforcing member 31. The reinforcing members 33 are arranged in intersection parts between the beam members 22b to 22e, and the pillar members 23. Since the reinforcing members 33 couple the beam members 22b to 22e and the pillar members 23 to each other, it is possible to improve the rigidity of the cab 20. Also, since the reinforcing members 33 are arranged on the recessed parts of the deformed sections of the beam members 22b to 22e, it is possible to easily position the reinforcing members 33.

The reinforcing member 34 is arranged on the beam member 22e arranged on the rear side. The reinforcing member 34 is secured to the beam member 22e, and the pillar members 23c and 23d that are arranged on the both ends of the beam member 22e (see FIG. 7). Since the reinforcing member 34 couples the beam member 22e and these pillar members 23 to each other, similar to the reinforcing member 33, it is possible to improve the rigidity of the cab 20. Also, similar to the aforementioned reinforcing members 33, since the reinforcing member 34 is arranged on the recessed part of the deformed section of the beam member 22b to 22e, it is possible to easily position the reinforcing members 33.

Configuration of Pillar Member 23

Figure 7:
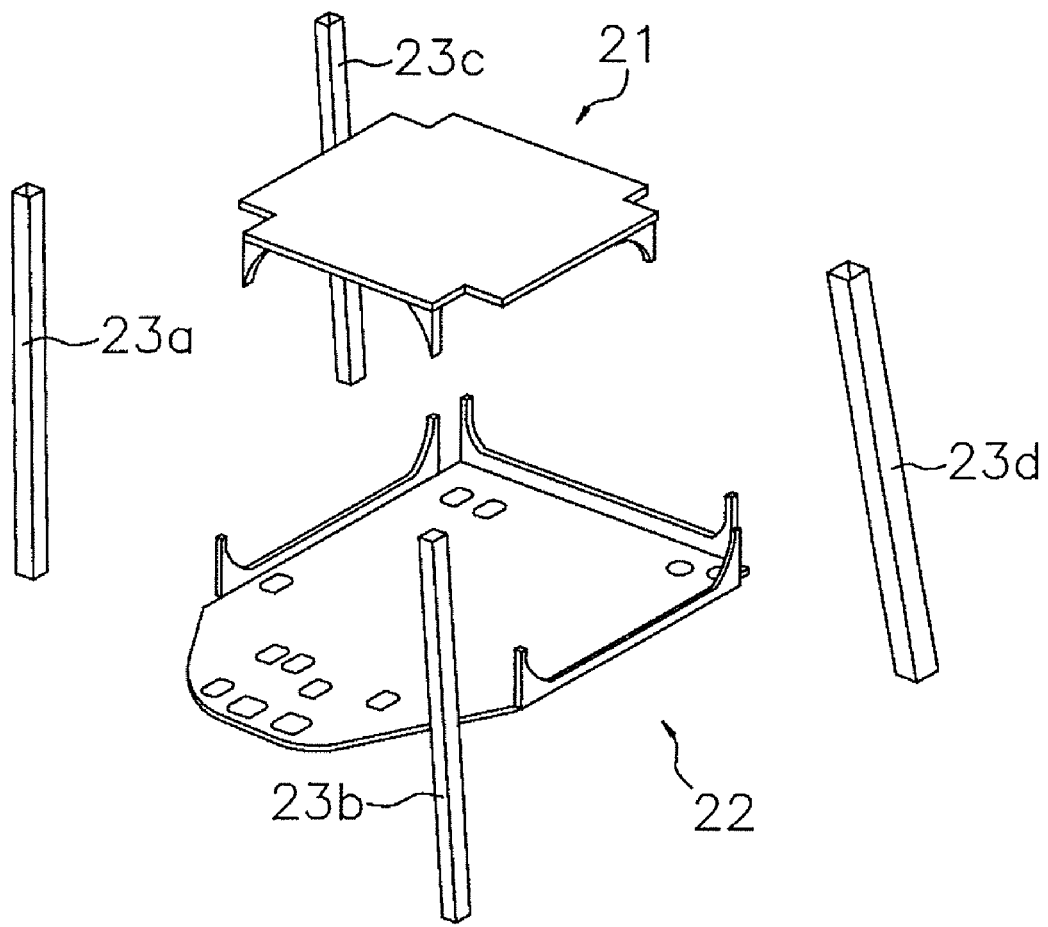
FIG. 7 is an exploded perspective view showing that pillar members are laterally attached to the roof member shown in FIG. 4 and the floor member shown in FIG. 6.

The pillar members 23 include the four pillar members 23a to 23d shown in FIG. 7, and the two pillar members 23e shown in FIG. 2 or the like. The four pillar members 23a to 23d are laterally mounted into the joint space parts X formed at the four corners of the roof member 21 between the beam members 21b to 21e, and into the joint space parts X formed at the four corners of the floor member 22 between the beam members 22b to 22e. Other two pillar members 23e stand upright in the central parts of the side surfaces of the cab 20.

Figure 8:
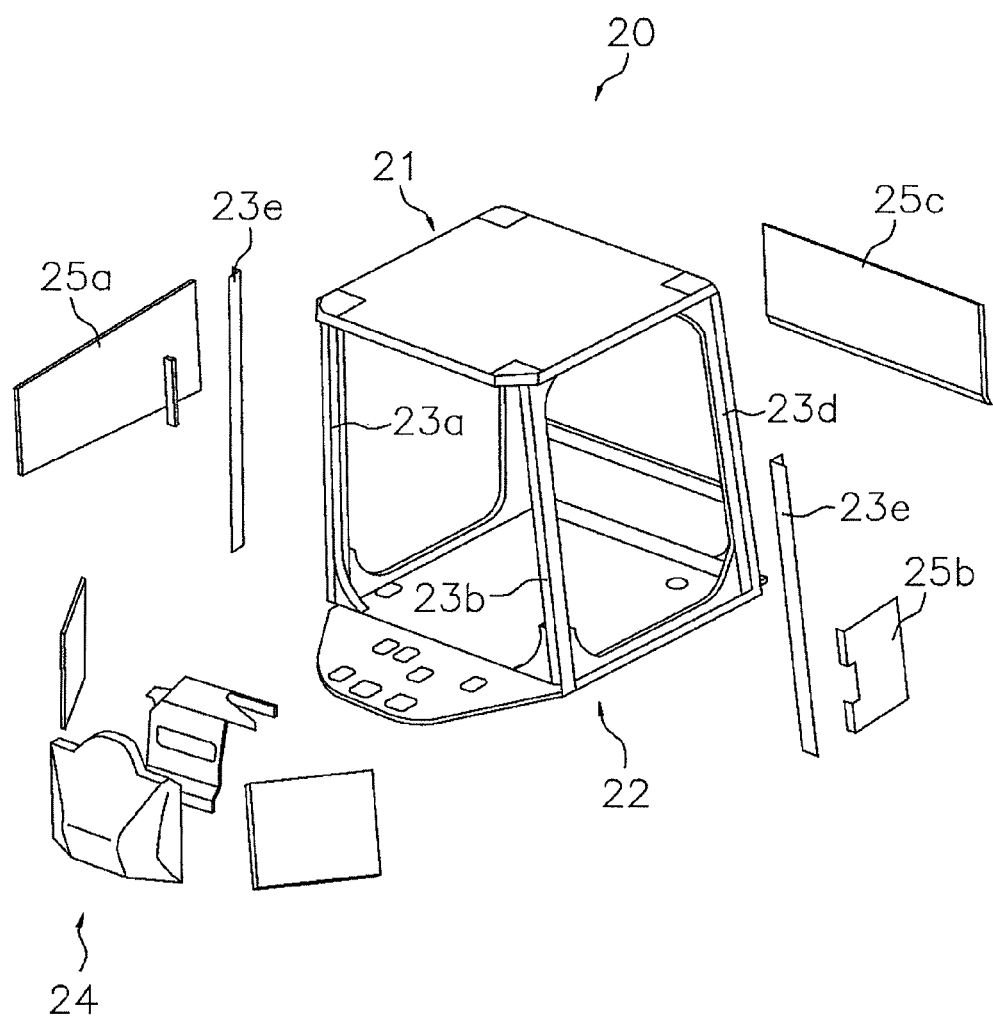
FIG. 8 is an exploded perspective view showing that the members that compose the cab shown in FIG. 2 are attached.
Figure 9:
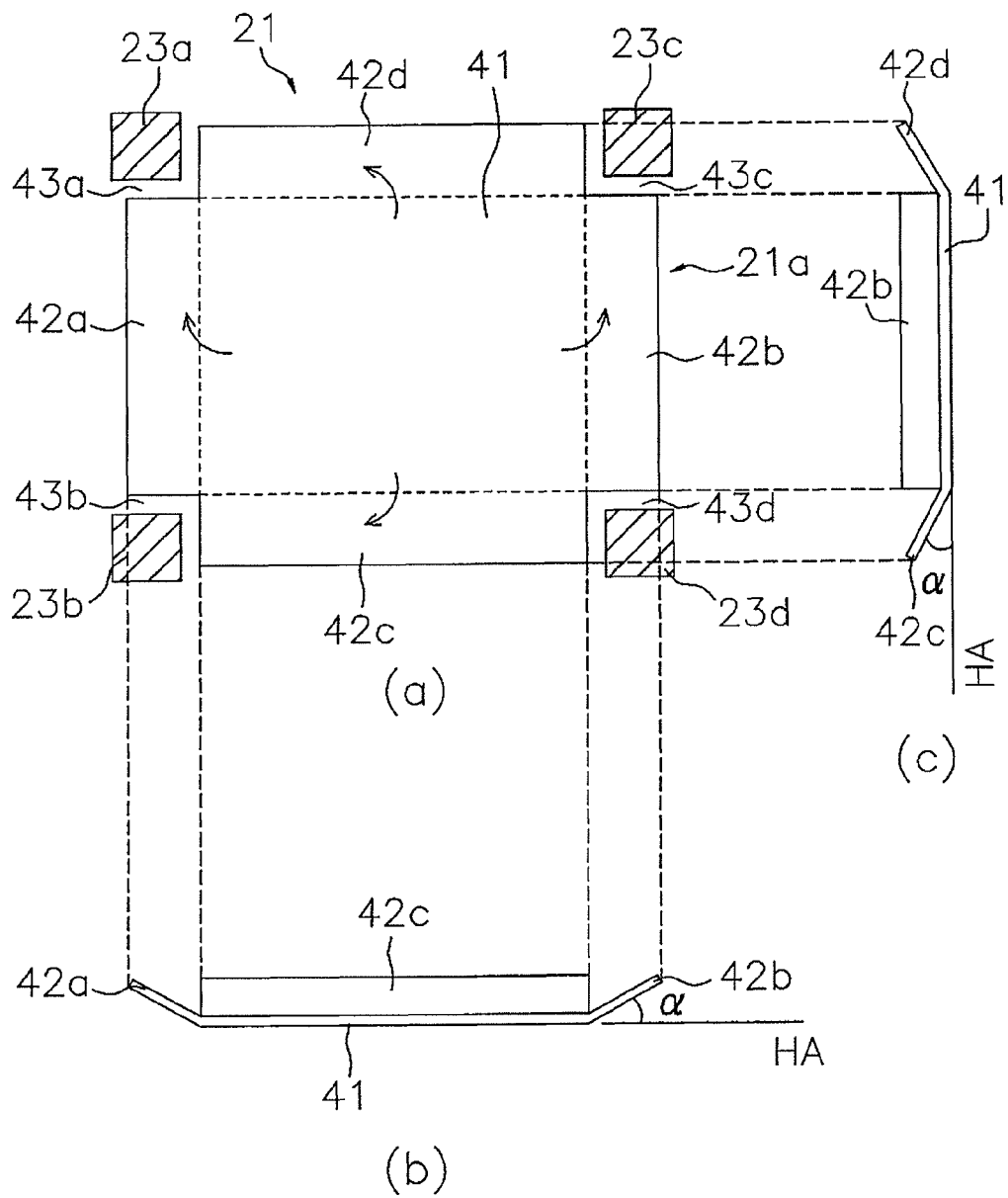
FIGS. 9(*a*) through 9(*c*) are a plan view, a front view and a side view, respectively, showing the configuration of a roof panel to be attached to a roof surface of the cab shown in FIG. 2.
Figure 10:
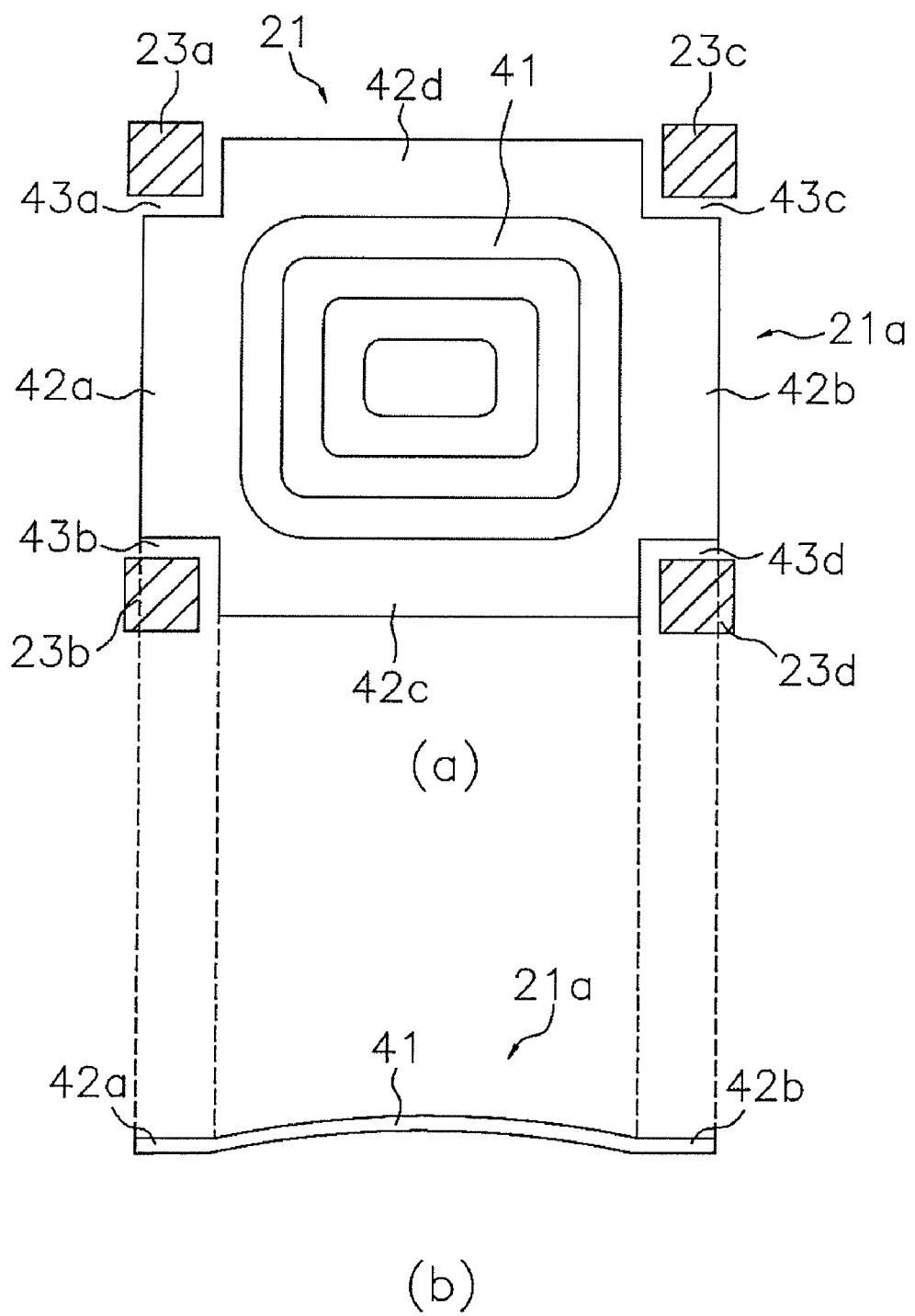
FIGS. 10 (*a*) and 10(*b*) are a plan view and a side view, respectively, showing the roof panel, which is held in the roof surface of the cab shown in FIG. 2.

After the four pillar members 23a to 23d are mounted to the roof member 21 and the floor member 22 to compose the cab 20, as shown in FIG. 8, the cab 20 is assembled by mounting the two pillar members 23e, the front cover member 24 including a plurality of cover members, a side cover members 25a and 25b, and the rear cover member 25c to the cab 20.

In the jointing space parts X2 of the roof member 21 and the floor member 22 to accommodate the pillar members 23a to 23d (see FIGS. 4 and 6), the ends of the beam members 21b to 21e and the beam members 22b to 22e are shaped to fit in with the deformed sections X1 of the pillar members 23a to 23d. Accordingly, the pillar members 23a to 23d can be laterally mounted to the roof member 21 and the floor member 22. In addition, the pillar members 23a to 23d can be inserted into and fit in with the joint parts. Also, since the pillar members 23a to 23d have deformed sections, recessed parts of the deformed sections can accommodate window glass, a door and the like to be mounted to the cab 20.

The pillar members 23a to 23d are secured by welding in the assembling procedure discussed later. The pillar members 23a to 23d can be welded from the exterior sides of the cab 20.

Configuration of Roof Panel 21a

Before secured on the roof part of the cab 20 by welding, as shown in FIGS. 9(a) to 9(c), the roof panel 21a is formed of a metal plate-shaped component that includes a rectangular planar portion 41 and bent portions 42a to 42d. The bent portions 42a to 42d extend along the four edges of the rectangular planar portion 41. The bent portions 42a to 42d are formed by bending constant width outer peripheral parts of a metal plate at a predetermined angle α toward one side. In this embodiment, after the bending, the planar portion 41 extends along a horizontal axis HA. The bent portions are bent at the angle α with respect to the horizontal axis HA.

As shown in FIGS. 9(b) and 9(c), the planar portion 41 is a flat surface portion that forms the roof surface of the cab 20. As shown in FIG. 9(a), the bent portions 42a to 42d extend along the four edges of the rectangular planar portion 41. Also, when the planar portion 41 is held on the roof part of the cab 20 in the assembling procedure discussed later, as shown in FIGS. 10(a) and 10(b), the planar portion 41 bulges externally of the roof surface.

As shown in FIGS. 9(b) and 9(c), the bent portions 42a to 42d are bent at the angle α with respect to the plane of the planar portion 41, and extend along all the edges of the planar portion 41 opposed to each other. The angle α is approximately 2 to 8 degrees. The bent portions 42a to 42d are bent at the angle α by a bender or a press. That is, the bent portions 42a to 42d are formed to allow the planar portion 41 to bulge externally of the roof surface when the bent portions 42a and 42b formed along edges of the planar portion 41 opposed to each other are held by clamps 51 (see FIGS. 12(a) and 12(b)) or the like. Also, cut-out portions 43a to 43d are formed between the bent portions 42a to 42d formed along all the edges of the planar portion 41 opposed to each other.

As shown in FIG. 11(a) or the like, the cut-out portions 43a to 43d are formed by cutting out four corner parts of the rectangular roof panel 21a. As shown in FIG. 10(a) or the like, the pillar members 23a to 23d are inserted into the cut-out portions 43a to 43d to form the cab 20. Since the cut-out portions 43a to 43d are formed, it is possible to prevent that the bent portions 42a to 42d adjacent to each other intersect each other in the corner parts. Therefore, the bent portions 42a to 42d can be easily and precisely formed.

Method of Manufacturing Cab 20 with Roof Panel 21a

The following description will describe a method of manufacturing the cab 20 in that the aforementioned roof panel 21a is used as the roof surface with reference to FIGS. 11(a) to 13.

Figure 13:
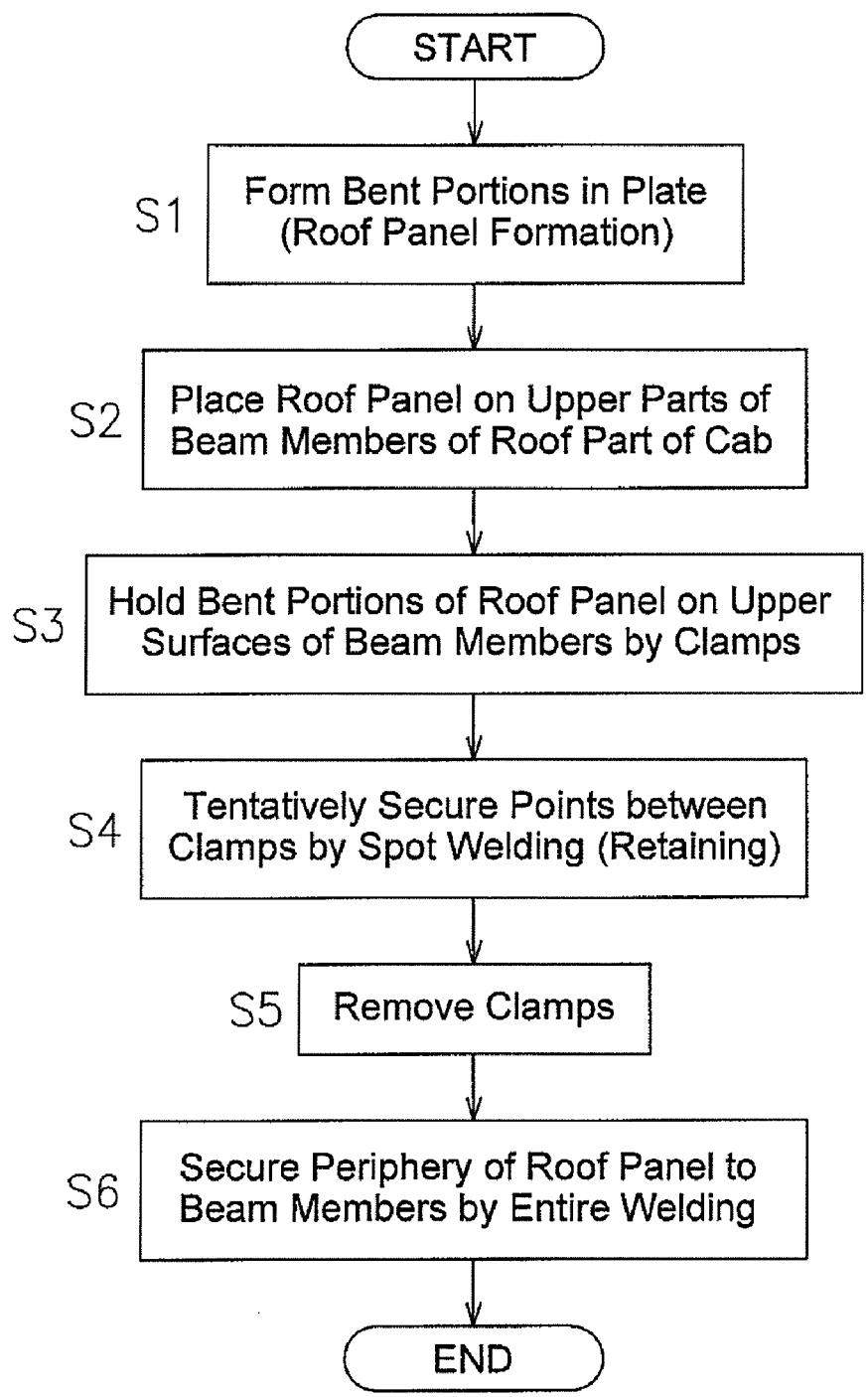
FIG. 13 is a flow chart showing the processes of manufacturing the cab shown in FIGS. 11(*a*) through 12(*c*).

That is, in the assembling procedure of the cab 20 according to this embodiment, the cab 20 is manufactured as shown in a flowchart of FIG. 13.

Figure 11:
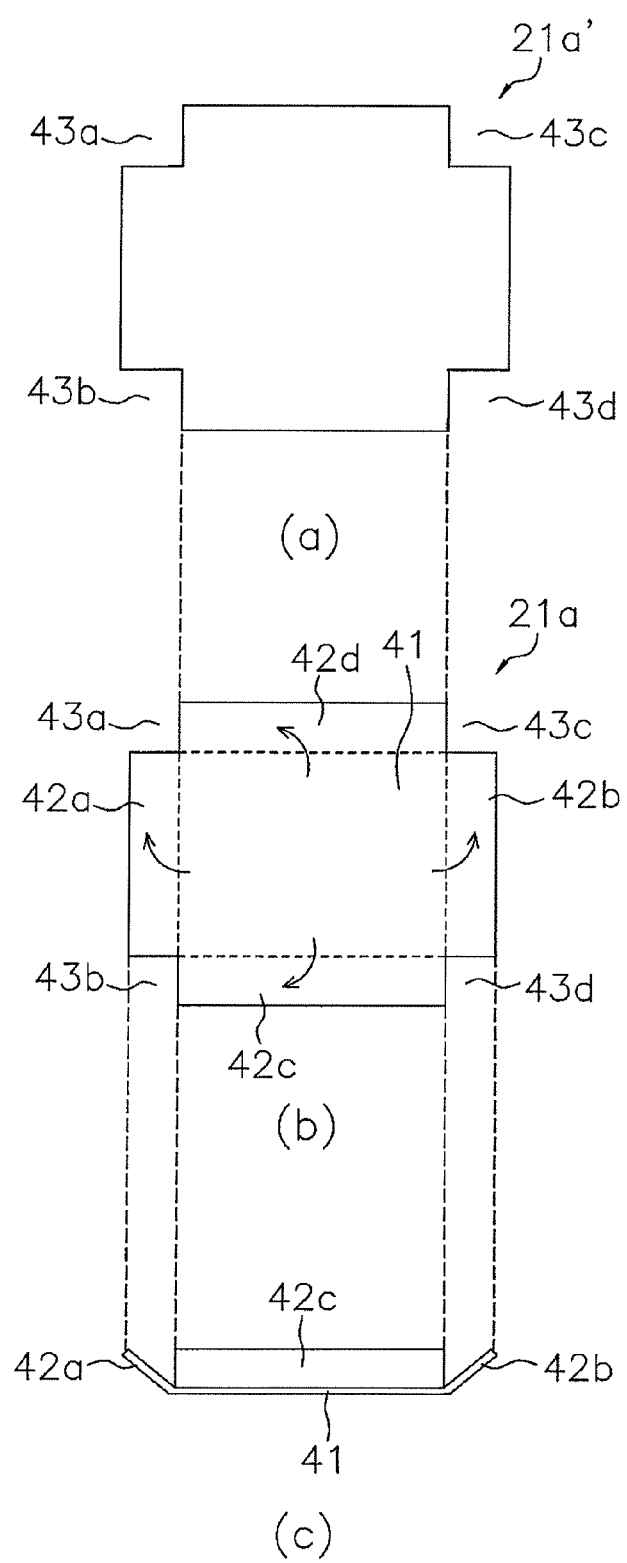
FIGS. 11(*a*) and 11(*b*) are plan views showing manufacturing processes of the roof panel shown in FIG. 9(*a*) or the like, while FIG. 11(*c*) is a side view of the roof panel.

In Step S1 (first step), the bent portions 42a to 42d are formed in a plate-shaped member 21a' shown in FIG. 11 (a) that has the cut-out portions 43a to 43d at the four corner parts so that the bent portions 42a to 42d extend along the four edges of the planar portion 41 as shown in FIGS. 11(b) and 11(c). The bent portions 42a to 42d are bent externally of the roof surface, in other words, the bent portions 42a to 42d are bent toward a side to allow the planar portion 41 to bulge upward. The angle of the bent portions 42a to 42d is approximately 2 to 8 degrees with respect to the plane of the planar portion 41. The angle of the bent portions 42a to 42d can be determined in consideration of the amount of thermal contraction after welding, and the degree of flatness of the roof surface after thermal contraction. For example, in the case where the bending angle of the bent portions 42a to 42d is 2 degrees with respect to the planar portion 41, thermal contraction can make the roof surface of the cab 20 flat after welding.

In Step S2 (second step), the roof panel 21a with the bent portions 42a to 42d shown in FIGS. 11(b) and 11(c) are placed on the roof part as the beam members 21b to 21e that serve as a top framework part of the cab 20.

Figure 12:
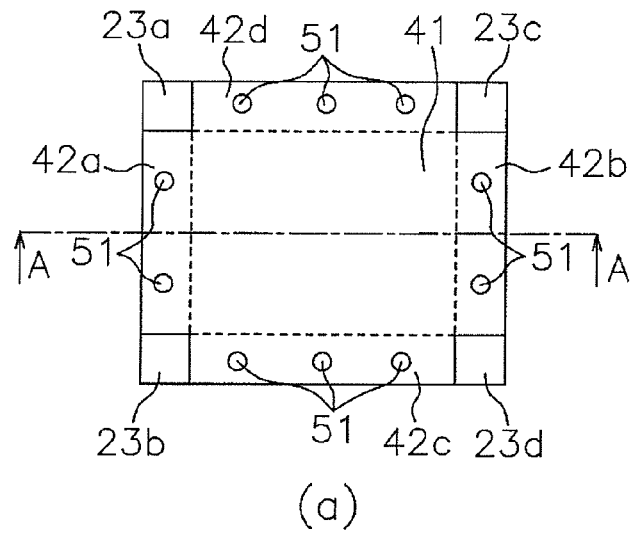
FIGS. 12 (*a*) through 12(*c*) are a plan view, side views showing processes in that the roof panel formed in the processed shown in FIGS. 11(*a*) through 11(*c*) is secured on a roof part of the cab.
Figure 12:
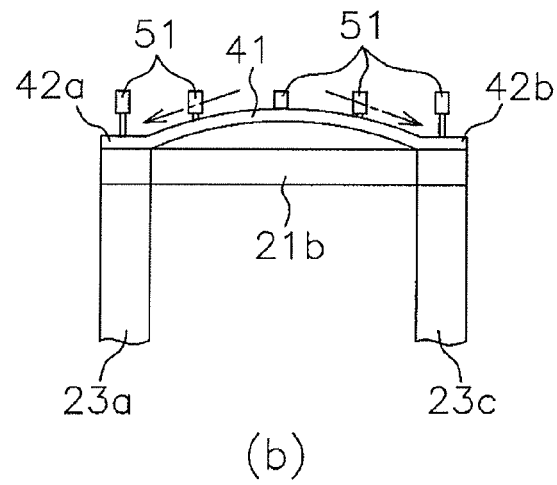
Figure 12:
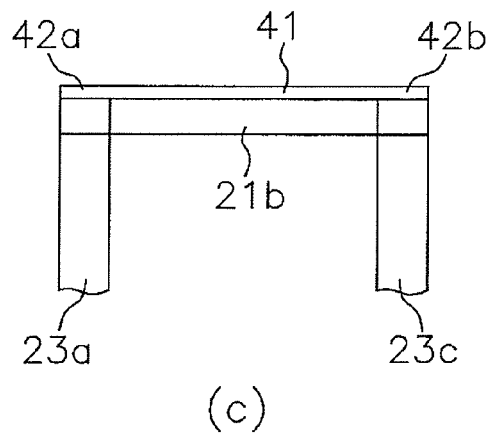

In Step S3 (second step), as shown in FIGS. 12(a) and 12(b), the bent portions 42a to 42d are held on the cab 20 side by the clamps 51. To hold the bent portions 42a to 42d on the cab 20 side, the aforementioned beam members 21b to 21e, and the aforementioned bent portions 42a to 42d are sandwiched and held by the clamps 51. Since the bent portions 42a to 42d are thus held, as shown by arrows in FIG. 12(b), tensile and compressive stresses are applied to the upper and lower surface sides of the planar portion 41, respectively. As a result, as shown in FIG. 12 (b), the roof panel 21a will bulge externally of the roof surface.

In Step S4, each of the bent portions 42a to 42d is tentatively secured (retained) by arc-spot welding (tentative welding) at several points between a plurality of clamps 51 that hold each of the bent portions 42a to 42d with each of the bent portions 42a to 42d being held as shown in FIG. 12(b).

In Step S5, since the roof panel 21a is retained on the cab 20 side by tentative welding, all the clamps 51 are removed.

In Step S6 (third step), the entire periphery of the roof panel 21a is held by tentative welding along the outer peripheral edges of the roof panel 21a held on the cab 20 side by tentative welding so that the roof panel 21a is fully secured on the roof part of the cab 20 (see FIG. 12(c)). In welding, while melted, previously-welded parts apply a tensile stress to the roof panel 21a toward the previously-welded parts. Thus, the roof panel 21a deforms so that the bulging part disappears that bulges externally of the roof surface. In this embodiment, the bending angle is previously determined so that, as shown in FIG. 12, the shape of the upper surface of the roof panel 21a becomes fully flat after deformation.

In the method of manufacturing the cab 20 according to this embodiment, after the roof panel 21a with the aforementioned bent portions 42a to 42d is formed as shown in FIG. 11(b) or the like, the several points of each of the bent portions 42a to 42d are held on the cab 20 side by the plurality of clamps 51 as shown in FIG. 12(a) or the like. In this case, since the bent portions 42a to 42d are bent externally of the roof surface, when the bent portions 42a to 42d are held on the cab 20 side, the roof panel will bulge externally of the roof surface as shown in FIG. 12(b). The roof panel 21a is then secured on the cab 20 side by welding. As a result, even if one surface of the planar portion 41 of the roof panel 21a contracts due to the thermal contraction after welding and the like, it is possible to prevent that the roof surface is dented.

Since the roof panel is held to bulge externally of the roof surface before welding, and is then welded and secured, it is possible to prevent that the roof surface is distorted, deformed or dented due to thermal contraction after welding and the like. As a result, the simply-configured roof panel 21a that includes the bent portions 42a to 42d along the outer periphery of the planar portion 41 can prevent that the roof surface of the cab 20 is dented or deformed without constraint members on the lower surface of a roof surface.

Features of Roof Panel 21a (1) The roof panel 21a according to this embodiment is a member that composes the roof surface of the cab 20 installed on the wheel loader 10 shown in FIG. 1. As shown in FIGS. 9(a) to 9(c), the roof panel 21a includes the planar portion 41 that serves as the roof surface of the cab 20, and the bent portions 42a to 42d that are formed on the outer periphery of the planar portion 41 and are bent at a predetermined angle α with respect to the planar portion 41. The bent portions 42a to 42d serves as joint parts joined to the beam members 21b to 21e and the like, and as parts of the roof surface of the cab 20.

In this configuration, as shown in FIGS. 10(a) and 10(b), when the roof panel 21a is mounted on the roof part of the cab 20, a stress is generated so that the planar portion 41 bulges externally of the roof surface. As a result, when the thus-mounted roof panel 21a is secured on the roof part of the cab 20 by welding, even if the planar portion 41 contracts due to thermal contraction after welding, the distortion of the roof panel is suppressed to a degree that the height of bulging planar portion decreases. Therefore, it is possible to prevent that the roof surface is dented or distorted. It should be appreciated that, although, in this embodiment, a completed upper surface of the roof member 21 is formed in a fully flat shape, the bulging part may remain on the upper surface of the roof member 21.

(2) The roof panel 21a according to this embodiment has the cut-out portions 43a that are formed between the bent portions 42a to 42d formed along the edges of the planar portion 41 opposed to each other as shown in FIG. 11(b).

In this configuration, it is possible to prevent that the bent portions 42a to 42d adjacent to each other intersect each other, and to easily and precisely form the bent portions 42a to 42d. Therefore, the height of the bulging part of the planar portion 41 can be precisely controlled when the planar portion 41 is mounted on the roof part of the cab 20. Consequently, the roof surface with a desired shape can be formed after the assembling procedure.

(3) As shown in FIG. 11(b) or the like, the roof panel 21a according to this embodiment includes the bent portions 42a and 42b along edges of the planar portion 41 opposed each other, and the bent portions 42c and 42d along the other edges of the planar portion 41 opposed each other.

In this configuration, when the roof panel 21a is mounted on the roof part of the cab 20, stresses can be generated in the front-to-rear direction (bent portions 42a and 42b) and the lateral direction (bent portions 42c and 42d) in the roof surface of the cab 20. Therefore, it is possible to easily bulge the roof surface externally of the roof surface as shown in FIGS. 10(a) and 10(b).

(4) As shown in FIG. 11(b) or the like, the roof panel 21a according to this embodiment includes the bent portions 42a to 42d along all the four edges of the rectangular planar portion 41.

In this configuration, when the roof panel 21a is mounted on the roof part of the cab 20, stresses can be generated in the front-to-rear direction and the lateral direction in the roof surface of the cab 20. As a result, it is possible to bulge the roof surface in a bowl shape as shown in FIGS. 10(a) and 10(b). Therefore, the roof panel 21a can contract uniformly in the front-to-rear and lateral directions. Consequently, it is possible to effectively prevent that the roof surface is dented or distorted due to thermal contraction after welding and the like.

(5) The roof panel 21a according to this embodiment is formed from a generally quadrangular panel as shown in FIGS. 9(a) to 9(c).

In this configuration, in the case where the bent portions 42a to 42d extend along two edges opposed to each other or all the four edges of the planar portion 41, the planar portion 41 can easily bulge externally of the roof surface when the bent portions 42a to 42d are mounted on the roof part of the cab 20.

(6) In the cab 20 according to this embodiment, the aforementioned roof panel 21a serves as the roof surface as shown in FIG. 8 or the like.

In this configuration, since the bent portions 42a to 42d of the roof panel 21a are held on and then welded to the roof part of the cab 20, the roof surface externally bulges before the welding and absorbs thermal contraction after the welding. Therefore, it is possible to provide the cab 20 that has an effect similar to the foregoing effect in that it is possible to prevent that the roof surface is dented or distorted after the welding.

(7) In the cab 20 according to this embodiment, the aforementioned roof panel 21a serves as the roof surface as shown in FIG. 9(a) or the like, and side surfaces of the pillar members 23a to 23d contact the roof panel 21a in the cut-out portions 43a to 43d formed in the four corner parts of the roof panel 21a.

In this configuration, after the roof member 21 and the floor member 22 are tentatively assembled, the pillar members 23a to 23d can be laterally inserted and then welded from the exterior sides of the cab 20. Therefore, the cab 20 can be assembled with improved workability.

(8) In the method of manufacturing the cab 20 according to this embodiment, as shown in FIG. 13, in Step S1, the bent portions 42a to 42d are formed in predetermined locations in the plate-shaped member 21a' (first step). Subsequently, in Step S2, the roof panel 21a is placed on the roof part, and then, in Step S3, the several points of each of the bent portions 42a to 42d are held on the cab 20 side by the clamps 51 (second step). After that, in Step S6, the roof panel 21a is secured on the cab 20 side by welding (third step).

In this configuration, since the roof panel 21a is mounted on the roof part of the cab 20 in Step S3, the planar portion 41 can bulge externally of the roof surface. Therefore, after the welding in Step S6, it is possible to prevent that the roof surface is dented or distorted due to thermal contraction after the welding and the like.

Second Embodiment

With reference to FIGS. 14 through 18, the following description will describe a roof panel 71a according to another embodiment of the present invention, a cab 120 that includes a roof surface including the roof panel 71a, and a method of manufacturing the cab 120.

Figure 14:
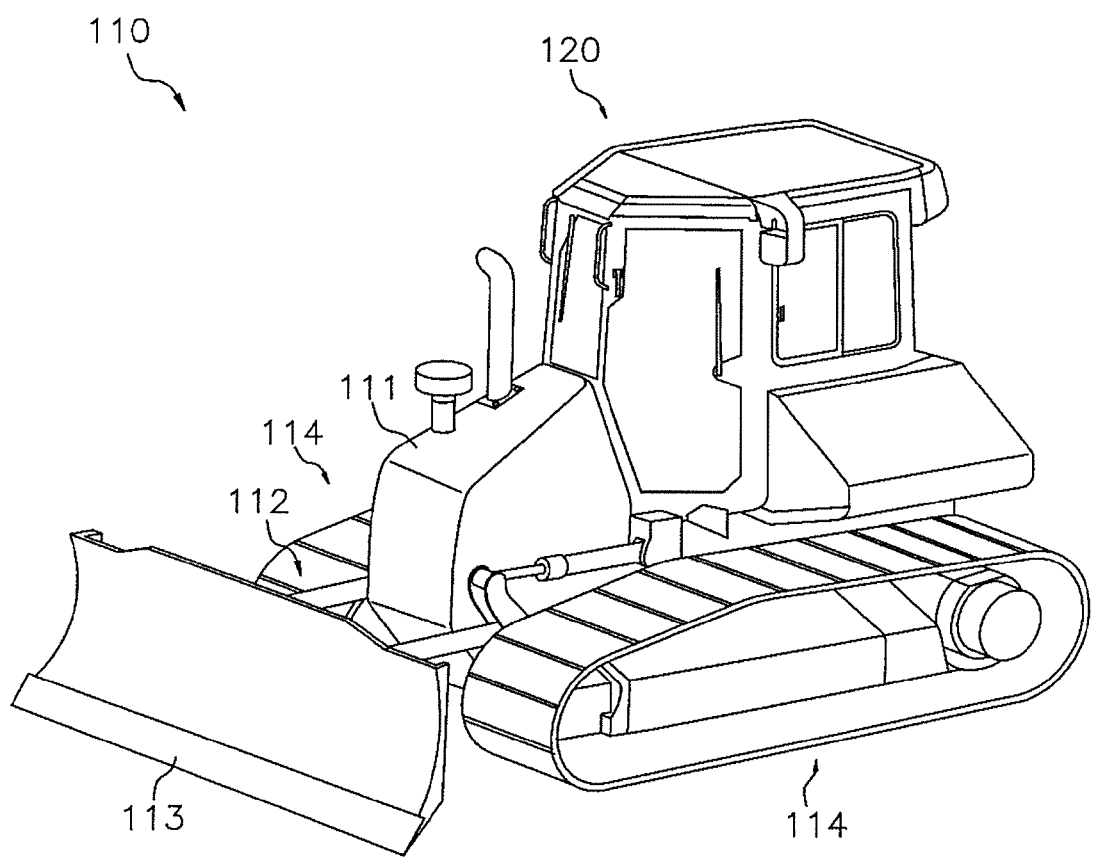
FIG. 14 is an external view showing a bulldozer, which includes a cab according to another embodiment of the present invention.
Figure 15:
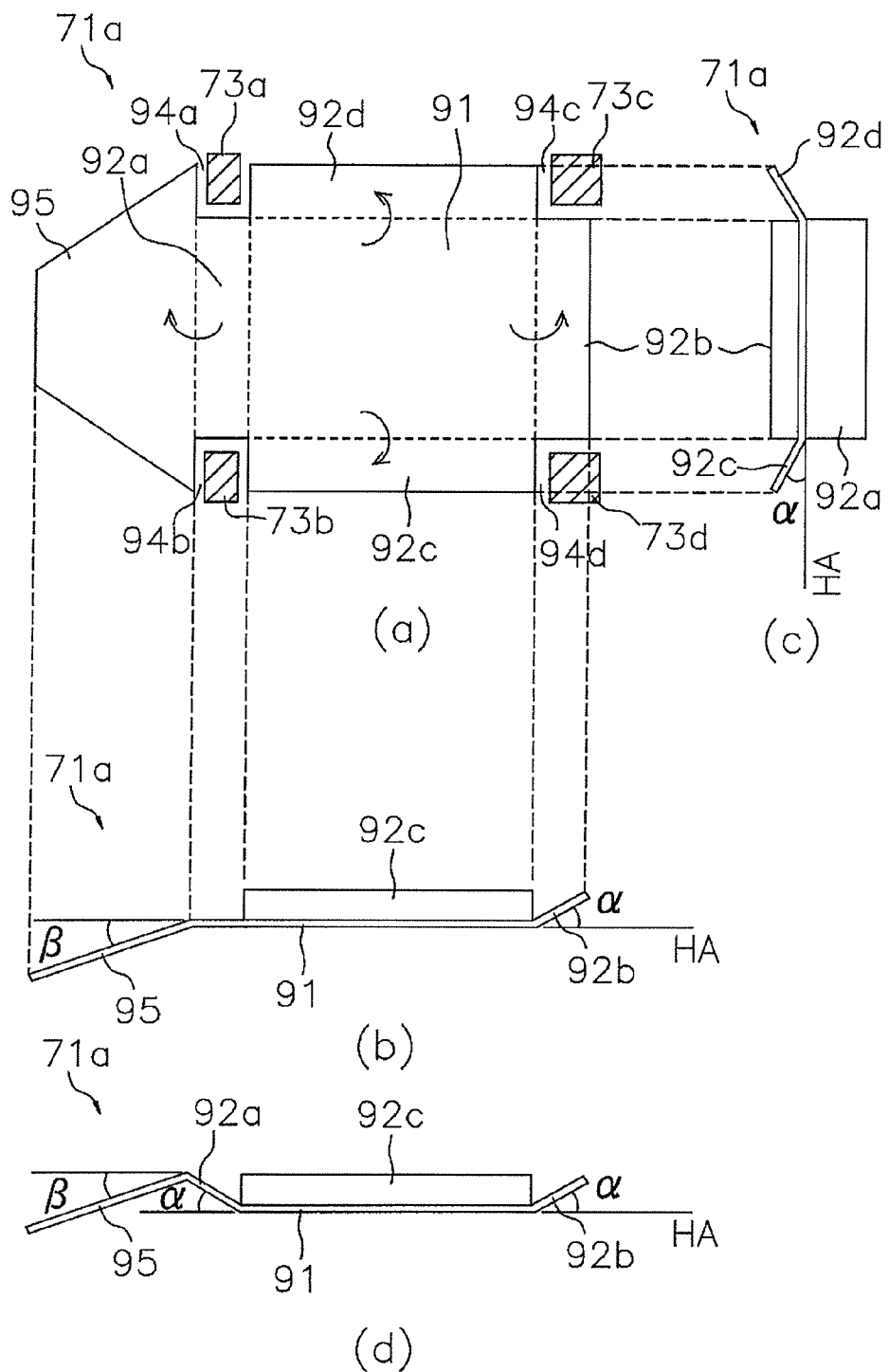
Figure 16:
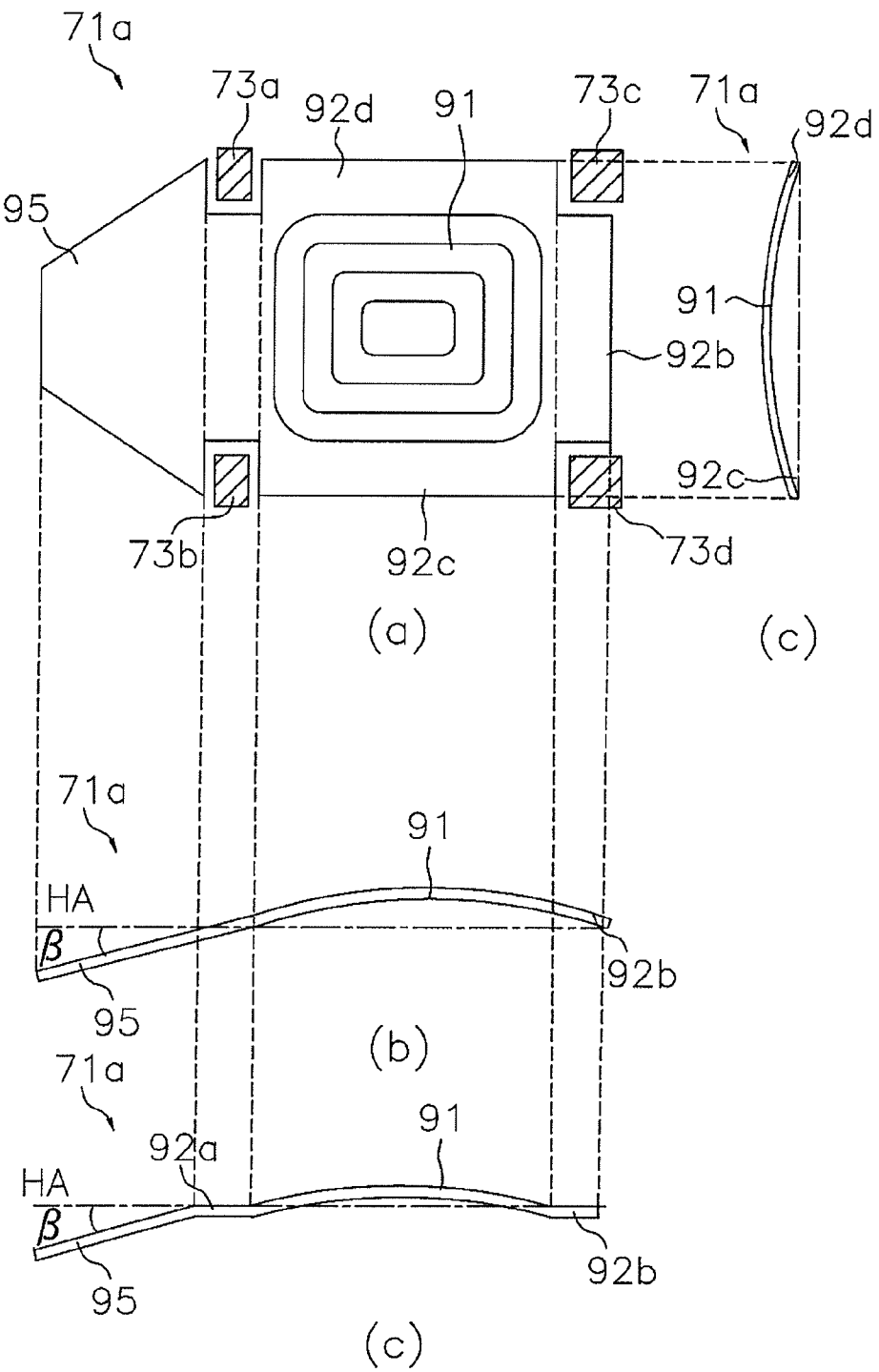
Figure 17:
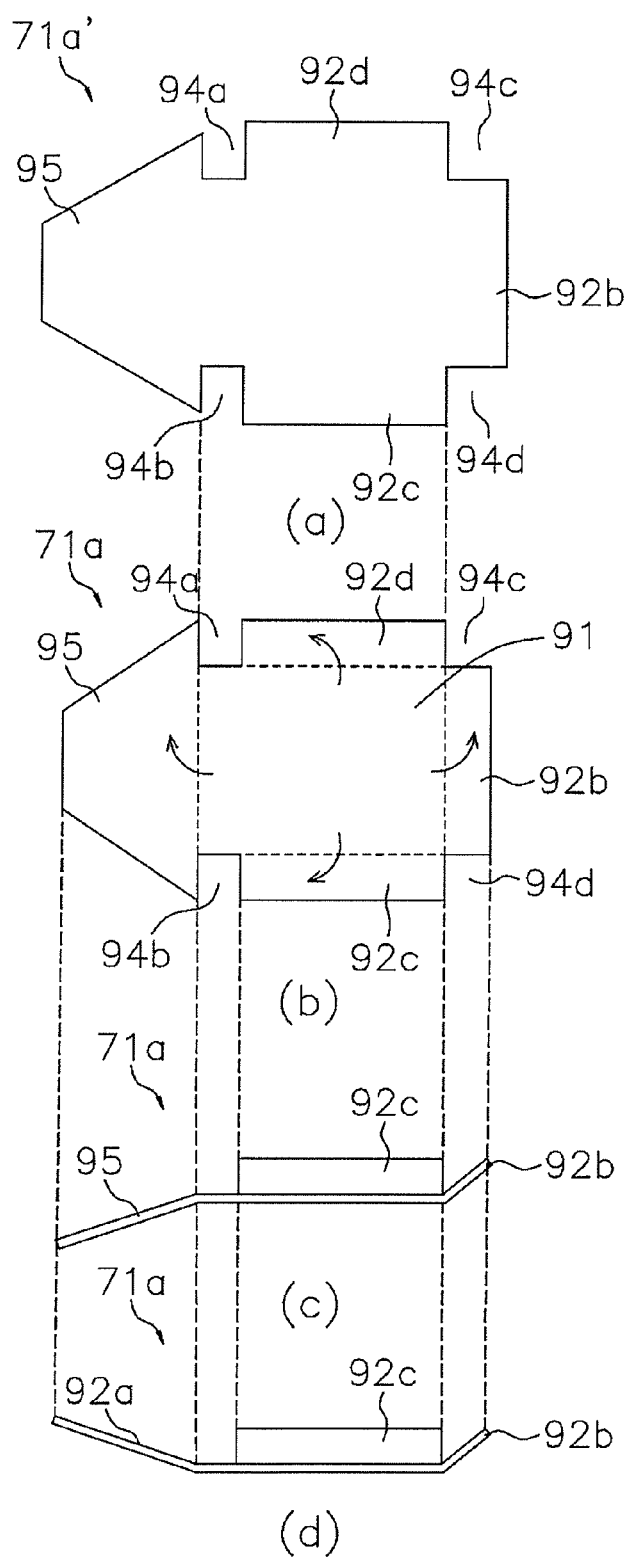

As shown in FIG. 14, the cab 120 according to this embodiment is installed on a bulldozer 110 that includes a body 111, lift arms 112, a dozing blade 113, and crawler belts 114.

As shown in FIGS. 15(a) to 15(c), the roof panel 71a with a generally hexagonal shape is used as a member that composes a roof surface of the cab 120. The generally hexagonal shape has a narrow edge of the roof panel 71a on the vehicle front side in plan view.

Configuration of Roof Panel 71a

Before secured to the roof part of the cab 120 by welding, as shown in FIGS. 15(a) to 15(c), the roof panel 71a is formed of a metal plate-shaped component that includes a rectangular planar portion 91 and bent portions 92a to 92d. The bent portions 92b to 92d extend along edges of the rectangular planar portion 91 except for a front edge of the rectangular planar portion 91. The bent portions 92a to 92d are formed by bending outer peripheral parts of a metal plate externally of the roof surface at a predetermined angle α with respect to the planar portion 41. In the roof panel 71a, an inclined portion 95 is bent downward along the front edge of the planar portion 91 at a predetermined angle β with respect to the planar portion 41.

As shown in FIGS. 15(b) and 15(c), the planar portion 91 is a flat surface portion that forms the roof surface of the cab 120. As shown in FIG. 15(a), the bent portions 92b to 92d extend along, except for the front edge, the other three edges of the rectangular planar portion 91. Also, when the planar portion 91 is held on the roof part of the cab 120 in assembling procedure discussed later, and the bent portions 92b to 92d are held on the cab 120 side, as shown in FIGS. 16(a) to 16(c), the planar portion 91 bulges externally of the roof surface.

The inclined portion 95 frontward protrudes along the shape of the roof surface of the cab 120 of the bulldozer 110, and is bent downward at the angle β by a bender, a press or the like. The angle β is determined within a range of 2 to 10 degrees according to the shape of the roof part to be mounted to the cab 120.

As shown in FIGS. 15(b) and 15(c), the bent portions 92a to 92d are bent at the angle α with respect to the plane of the planar portion 91. The angle α is approximately 2 to 8 degrees. The bent portions 92a to 92d are bent at the angle α by a bender or a press. That is, the bent portions 92a to 92d are formed to allow the planar portion 91 to bulge externally of the roof surface when the bent portions 92a and 92b formed along edges of the planar portion 91 opposed to each other are held by the clamps 51 (see FIGS. 18(a) and 18(b)) or the like. Also, cut-out portions 94a to 94d are formed between the bent portions 92b to 92d formed along edges of the planar portion 91 opposed to each other.

As shown in FIG. 17(a) or the like, the cut-out portions 94a to 94d are formed by cutting out four corner parts of the rectangular planar portion 91 of the roof panel 71a. As shown in FIG. 15(a) or the like, the aforementioned pillar members 73a to 73d are laterally inserted into space parts of the cut-out portions 94a to 94d to form the cab 120. Since the cut-out portions 94a to 94d are formed, it is possible to prevent that the bent portions 92a to 92d adjacent to each other intersect each other in the corner parts. Therefore, the bent portions 92a to 92d can be easily and precisely formed.

Method of Manufacturing Cab 120 with Roof Panel 71a

The following description will describe a method of manufacturing the cab 120 in that the aforementioned roof panel 71a is used as the roof surface with reference to FIGS. 17(a) to 18(c).

That is, in the assembling procedure of the cab 120 according to this embodiment, the cab 120 is manufactured as shown in a flowchart of FIG. 13 similar to the foregoing first embodiment.

In Step S1 (first step), the bent portions 92b to 92d, and the inclined portion 95 are formed in a plate-shaped member 71a' shown in FIG. 17(a) that has the cut-out portions 94a to 94d at the four corner parts of the planar portion 91 so that the bent portions 92b to 92d extend along, except for a front edge, the other three edges of the planar portion 91 as shown in FIGS. 17(b) and 17(c), and the inclined portion 95 extends along the front edge. The inclined portion 95 protrudes frontward, and is bent downward. The inclined angle of the inclined portion 95 is approximately about 2 to 10 degrees upward with respect to the plane of the planar portion 91. The inclined angle can be determined in consideration of the shape of the roof part of the cab 120. The angle of the bent portions 92b to 92d is approximately 2 to 8 degrees with respect to the plane of the planar portion 91. The angle of the bent portions 92b to 92 can be determined in consideration of the amount of thermal contraction after welding, and the degree of flatness of the roof surface after thermal contraction. For example, in the case where the bending angle of the bent portions 92a to 92d is 2 degrees with respect to the planar portion 91, thermal contraction can make the roof surface of the cab 120 flat after welding.

In Step S2 (second step), the roof panel 71a with the inclined portion 95 and the bent portions 92b to 92d shown in FIGS. 17(b) and 17(c) are placed on the roof part of the cab 120 as shown in FIG. 18(a).

Figure 18:
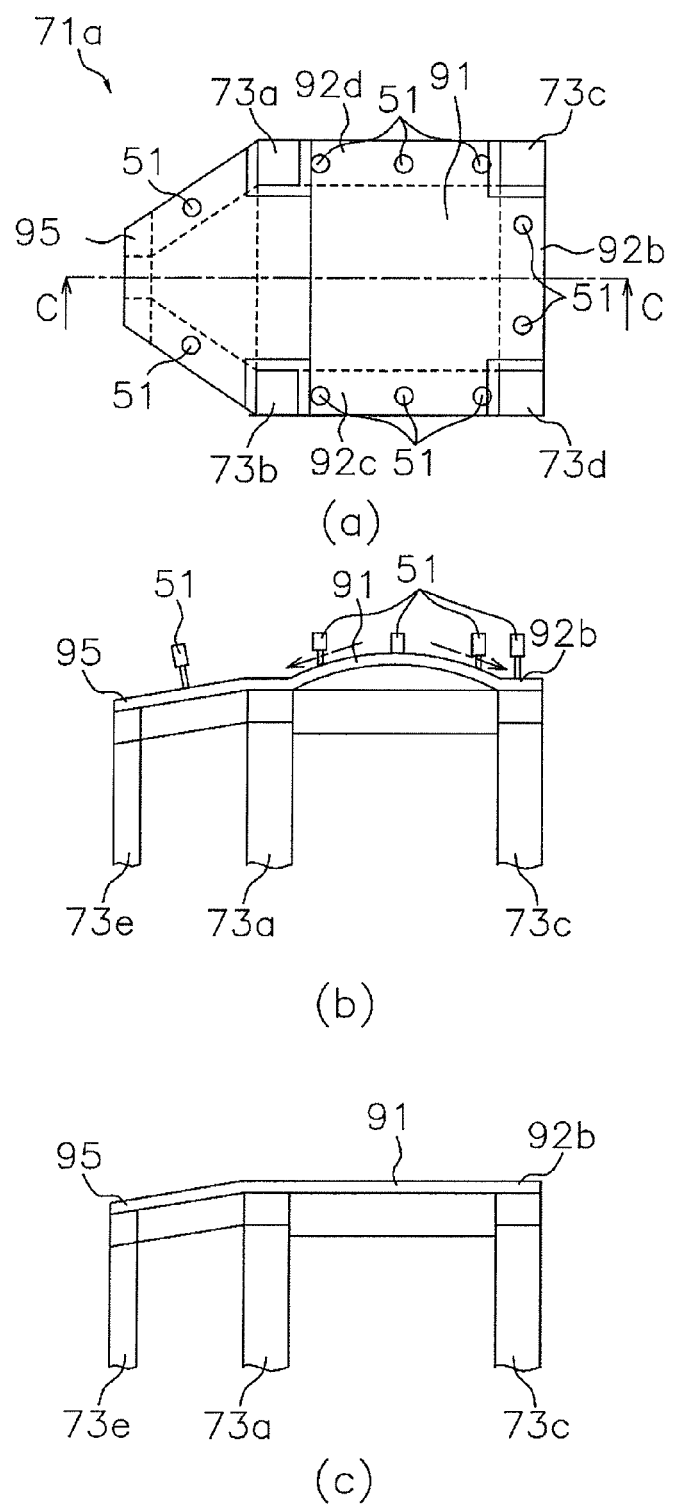
FIGS. 18(a) through 18(c) are a plan view, side views showing processes in that the roof panel formed in the processed shown in FIGS. 17(a) through 17(c) is secured on a roof part of the cab.

In Step S3 (second step), as shown in FIGS. 18(a) and 18(b), the inclined portion 95 and the bent portions 92b to 92d are held on the cab 120 side by the clamps 51. When the inclined portion 95 and the bent portions 92b to 92d are held on the cab 120 side, the beam members 21b to 21e discussed in the first embodiment, and the bent portions 92a to 92d are sandwiched and held. Since the inclined portion 95 and the bent portions 92b to 92d are thus held, as shown by arrows in FIG. 18(b), tensile and compressive stresses are applied to the upper and lower surface sides of the planar portion 91, respectively. As a result, as shown in FIG. 18 (b), the planar portion 91 will bulge externally of the roof surface.

In Step S4, each of the inclined portion 95 and the bent portions 92b to 92d is tentatively welded (tentatively welded) between a plurality of clamps 51 that hold each of the inclined portion 95 and the bent portions 92b to 92d with each of the inclined portion 95 and the bent portions 92b to 92d being held as shown in FIG. 18(b).

In Step S5, since the roof panel 71a is retained on the cab 120 side by tentative welding, all the clamps 51 are removed.

In Step S6 (third step), the roof panel 71a is retained by tentative welding along the outer peripheral edges of the roof panel 71a held on the cab 120 side by tentative welding so that the roof panel 71a is fully secured on the roof part of the cab 120.

In the method of manufacturing the cab 120 according to this embodiment, after the roof panel 71a with the aforementioned inclined portion 95 and the aforementioned bent portions 92b to 92d is formed as shown in FIG. 17(b) or the like, each of the bent portions 92a to 92d are held on the cab 120 side by the plurality of clamps 51 as shown in FIG. 18(a) or the like. In this case, since the bent portions 92b to 92d are bent externally of the roof surface, when the roof panel 71a is held on the cab 120 side, the roof panel 71a will bulge externally of the roof surface as shown in FIG. 18(b). The roof panel 71a is then secured on the cab 120 side by welding. As a result, even if one surface of the planar portion 91 of the roof panel 71a contracts due to the thermal contraction after welding and the like, it is possible to prevent that the roof surface is dented.

Since the roof panel is held to bulge externally of the roof surface before welding, and is then welded and secured, it is possible to prevent that the roof surface is distorted, deformed or dented due to thermal contraction after welding and the like. As a result, the simply-configured roof panel 71a that includes the bent portions 92b to 92d along the outer periphery of the planar portion 91 has an effect similar to the foregoing first embodiment in that it is possible to prevent that the roof surface of the cab 120 is dented or distorted without constraint members on the back surface of a roof surface.

Features of Roof Panel 71A (1) The roof panel 71a according to this embodiment composes the roof surface of the cab 120 installed on the bulldozer 110 shown in FIG. 14. As shown in FIGS. 15(a) to 15(c), the roof panel 71a includes the planar portion 91 that serves as the roof surface of the cab 120, and the bent portions 92b to 92d that are formed on the outer periphery of the planar portion 91 and are bent at a predetermined angle α with respect to the planar portion 91.

In this configuration, as shown in FIG. 16(b), when the roof panel 71a is mounted on the roof part of the cab 120, a stress is generated so that the planar portion 91 bulges externally of the roof surface. As a result, when the thus-mounted roof panel 71a is secured on the roof part of the cab 120 by welding, even if the planar portion 91 contracts due to thermal contraction after welding, the distortion of the roof panel is suppressed to a degree that the height of bulging planar portion decreases. Therefore, it is possible to prevent that the roof surface is dented or distorted.

(2) The roof panel 71a according to this embodiment is formed of a generally hexagonal plate that has a narrow edge on the vehicle front side.

In this configuration, in the case where the bent portions 92c and 92d extend along two edges of the planar portion 91 opposed to each other, the planar portion 91 can easily bulge externally of the roof surface when the bent portions 92c and 92d are mounted on the roof part of the cab 120.

(3) In the cab 120 according to this embodiment, the aforementioned roof panel 71a serves as the roof surface as shown in FIG. 18(c) or the like.

In this configuration, since the bent portions 92b to 92d of the roof panel 71a are held on and then welded to the roof part of the cab 120, the roof surface externally bulges before the welding and absorbs thermal contraction after the welding. Therefore, it is possible to provide the cab 120 that has an effect similar to the foregoing effect in that it is possible to prevent that the roof surface is dented or distorted after the welding.

(4) In the cab 120 according to this embodiment, the aforementioned roof panel 71a serves as the roof surface as shown in FIG. 15(a) or the like, and side surfaces of the pillar members 73a to 73d contact the roof panel 71a in the cut-out portions 94a to 94d formed in the four corner parts of the roof panel 71a.

In this configuration, after the roof member 71 and the floor member are tentatively assembled, the pillar members 73a to 73d can be laterally inserted and then welded from the exterior sides of the cab 120. Therefore, the cab 120 can be assembled with improved workability.

(5) In the method of manufacturing the cab 120 according to this embodiment, as shown in FIG. 13, in Step S1, the bent portions 92a to 92d are formed in predetermined locations in the plate-shaped member 71a' (first step). After that, in Step S2, the roof panel 71a is placed on the roof part, and then, in Step S3, each of the bent portions 92a to 92d are held on the cab 120 side by the clamps 51 (second step). After that, in Step S6, the roof panel 71a is secured on the cab 120 side by welding (third step).

In this configuration, since the roof panel 71a is mounted on the roof part of the cab 120 in Step S3, the planar portion 91 can bulge externally of the roof surface. Therefore, after the welding in Step S6, it is possible to prevent that the roof surface is dented or distorted due to thermal contraction after the welding and the like.

Other Embodiments

The foregoing description has described exemplary embodiments according to the present invention. However, the present invention is not limited to the foregoing embodiments. Various changes and modifications can be made without departing from the spirit of the present invention.

(A) In the foregoing embodiment, the cut-out portions 43a to 43d have been illustratively described that are formed in the four corner parts of the roof panel 21a that serves the roof surface of the cab 20. However, the present invention is not limited to this.

Figure 19:
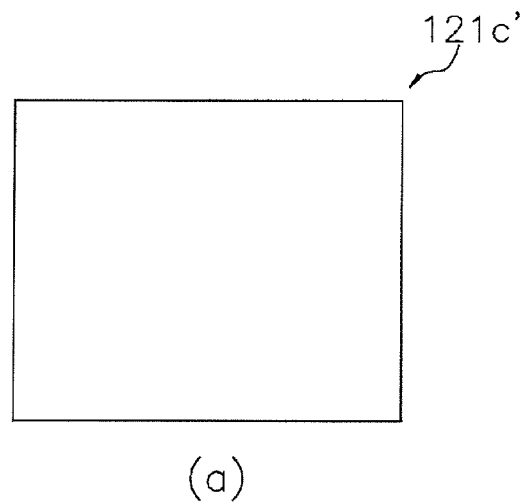
Figure 19:
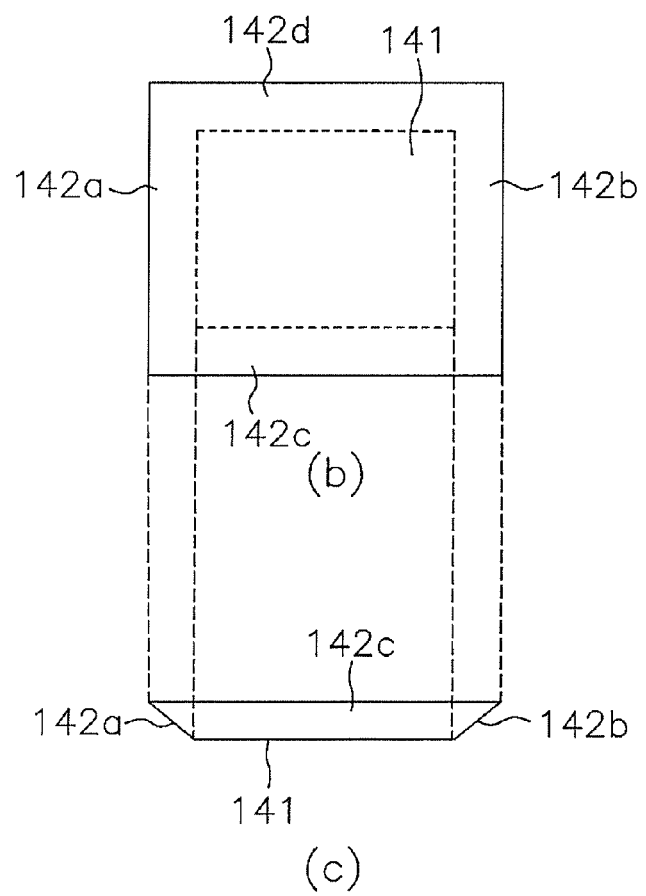

For example, as shown in FIGS. 19(a) to 19(c), a roof panel can be formed by deforming a plate-shaped member 121c' without the cut-out portions by using a press or the like so that bent portions 142a to 142d are formed in the outer periphery of a planar portion 141.

Figure 20:
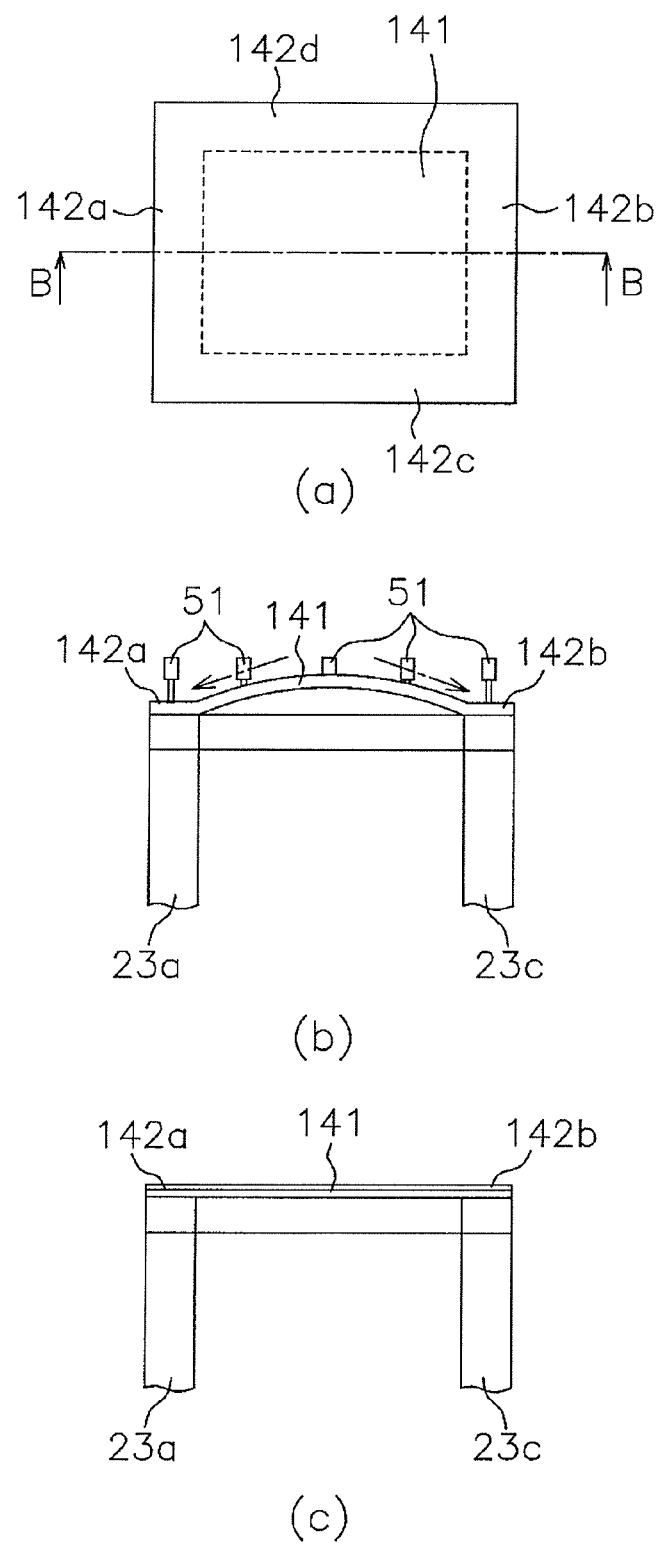
FIGS. 20(a) through 20(c) are a plan view, side views showing processes in that the roof panel formed in the processed shown in FIGS. 19(a) through 19(c) is secured on a roof part of the cab.

In this configuration, as shown in FIGS. 20(a) to 20(c), when the bent portions 142a to 142d are held on the roof part of the cab 2 by a plurality of clamps 51, the planar portion 141 will also bulge externally of the cab 20 similarly to the foregoing embodiments. For this reason, in the case where the roof panel is welded with the bent portions being thus held on the roof part (see FIG. 20(b)), this roof panel also can have an effect similar to the aforementioned effect in that, even if the roof panel contracts after welding, it is possible to prevent a dent of the roof surface of the cab and the like.

(B) In the foregoing second embodiment, portions of the roof panel 71a have been illustratively described that are bent upward at a predetermined angle α along, except for a front edge among the four edges of a rear-side quadrangular shape of the generally hexagonal shape 71a', the other three edges of the rear-side quadrangular shape as shown in FIGS. 15(a) to 15(c) and 16(a) to 16(c). However, the present invention is not limited to this.

For example, as shown in FIGS. 15(d) and 16(d), a portion may be additionally bent upward at a predetermined angle α along the front edge the rear-side quadrangular shape of the roof panel 71a.

(C) In the foregoing first and second embodiments, for example, in order that the planar portion 41 can bulge externally of the cab 20, the bent portions 42a to 42d have been illustratively described that extend along edges of the planar portion 41 opposed to each other. However, the present invention is not limited to this.

In the present invention, the bent portions are not always required to be formed along edges opposed to each other, for example, the bent portions may be dispersed uniformly about the center of a surface to bulge upward.

(D) In the foregoing first and second embodiments, the bent portions 42a to 42d and 92b to 92d have been illustratively described that are bent at angles α and β in ranges of approximately 2 to 8 degrees and approximately 2 to 10 degrees with respect to the planar portions 41 and 91. However, the present invention is not limited to this.

For example, it is preferable that the angles α and β be suitably adjusted in consideration of the coefficient of linear expansion and the like of a steel plate or the like to be used as a roof panel.

(E) In the first and second embodiments, the roof panels 21a and 71a have been illustratively described that are formed from plate-shaped members with a quadrangular shape and a generally hexagonal shape, respectively. However, the present invention is not limited to this.

For example, a generally circular plate-shaped member may be used as a roof panel.

(F) In the foregoing second embodiment, in the roof panel 71a that serves as the roof surface of the cab 120 of the bulldozer 110, the bent portion 92a has been illustratively described that is formed along a front edge of the planar portion 91 to protrude frontward and be inclined downward. However, the present invention is not limited to this.

For example, the bent portion 92a may protrude frontward and be bent upward as shown in FIG. 17(d) according to the shape of the roof surface of the cab to be installed.

In this configuration, when the bent portion 92a is held on the cab 120 side, the planar portion 91 will bulge upward also in the front-to-rear direction of the roof surface of the cab 120.

(G) In the foregoing first and second embodiments, the present invention has been illustratively described to be applied to the roof panels 21a and 121a that serve as the roof surfaces of the cabs 20 and 120 of the wheel loader 10 and the bulldozer 110, respectively. However, the present invention is not limited to this.

For example, the present invention can be applied to a roof panel that serves as a roof surface of a cab installed on another type of work vehicle such as dumper truck, motor grader and tractor.

A roof panel according to the illustrated embodiments, and a work vehicle cab including the roof panel and a method of manufacturing the cab can be widely applied to work vehicles such as wheel loader, bulldozer, dumper truck and tractor. The reason is that the roof panel according to illustrated embodiments, and the work vehicle cab including the roof panel and the method of manufacturing the cab provide an effect in that it is possible to prevent that the roof panel is dented after assembling procedure without increasing the component count of a cab.

The invention claimed is:

1. A method of manufacturing a work vehicle cab comprising:
    bending an outer peripheral parts of a plate-shaped member to form a roof panel including a planar portion having an upper surface and a lower surface, and a plurality of bent portions bent at a predetermined angle with respect to the planar portion toward the upper surface and away from the lower surface of the planar portion;
    placing the roof panel on top portions of beam members of a roof part of the work vehicle cab so that the lower surface of the planar portion faces an internal side of the work vehicle cab;
    holding the bent portions of the roof panel on the top portions of the beam members;
    tentatively securing the bent portions on the top portions of the beam members so that the planar portion of the roof panel bulges toward an external side of the work vehicle cab; and
    securing an entire periphery of the roof panel on the beam members of the roof part of the work vehicle cab by welding.

* * * * *